US012587591B2

(12) United States Patent (10) Patent No.: US 12,587,591 B2
Xin et al. (45) Date of Patent: Mar. 24, 2026

(54) COMMUNICATION METHOD AND COMMUNICATION APPARATUS

(71) Applicant: HUAWEI TECHNOLOGIES CO., LTD., Shenzhen (CN)

(72) Inventors: Yang Xin, Shanghai (CN); Qing Wei, Munich (DE); Weiwei Chong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 18/232,223

(22) Filed: Aug. 9, 2023

(65) Prior Publication Data

US 2023/0388389 A1      Nov. 30, 2023

Related U.S. Application Data

(63) Continuation of application No. PCT/CN2022/075346, filed on Feb. 7, 2022.

(30) Foreign Application Priority Data

Feb. 10, 2021    (CN) .......................... 202110185532.7

(51) Int. Cl.
　　*H04L 67/00*　　　(2022.01)
　　*H04L 67/1097*　　(2022.01)
　　*H04L 67/51*　　　(2022.01)

(52) U.S. Cl.
　　CPC .......... *H04L 67/34* (2013.01); *H04L 67/1097* (2013.01); *H04L 67/51* (2022.05)

(58) Field of Classification Search
　　None
　　See application file for complete search history.

(56) References Cited

FOREIGN PATENT DOCUMENTS

| | | | |
|---|---|---|---|
| CN | 110798360 A | 2/2020 | |
| CN | 111901367 A | * 11/2020 | ............. H04L 47/83 |
| WO | WO-2020224492 A1 | * 11/2020 | ............. H04L 47/83 |

OTHER PUBLICATIONS

3GPP TS 23.288 V16.6.0, "3rd Generation Partnership Project; Technical Specification Group Services and System Aspects; Architecture enhancements for 5G System (5GS) to support network data analytics services(Release 16)," Dec. 2020, 67 pages.

(Continued)

*Primary Examiner* — Natisha D Cox

(74) *Attorney, Agent, or Firm* — Fish & Richardson P.C.

(57) ABSTRACT

The present disclosure relates to communication methods and communication apparatuses. One example method includes receiving a request message from a service request network element, where the request message is used to request information about a target data analytics network element, the request message includes a first analytics identifier and information about a first service, and the target data analytics network element supports an analytics type corresponding to the first analytics identifier and the first service. The target data analytics network element is determined based on the first analytics identifier, the information about the first service, and association information between the first analytics identifier and the first service that corresponds to the target data analytics network element. Information about the target data analytics network element is sent to the service request network element.

16 Claims, 6 Drawing Sheets

(56)      References Cited

OTHER PUBLICATIONS

3GPP TS 23.501 V16.7.0, "3rd Generation Partnership Project; Technical Specification Group Services and System Aspects; System architecture for the 5G System (5GS); Stage 2(Release 16)," Dec. 2020, 450 pages.

3GPP TS 23.502 V16.7.1, "3rd Generation Partnership Project; Technical Specification Group Services and System Aspects; Procedures for the 5G System (5GS); Stage 2 (Release 16)," Jan. 2021, 603 pages.

Extended European Search Report in European Appln. No. 22752212. 5, mailed on Mar. 12, 2024, 10 pages.

* cited by examiner

Communication method 100

Communication method 100

200

300

400

COMMUNICATION METHOD AND COMMUNICATION APPARATUS

CROSS-REFERENCE TO RELATED APPLICATIONS

This application is a continuation of International Application No. PCT/CN2022/075346, filed on Feb. 7, 2022, which claims priority to Chinese Patent Application No. 202110185532.7, filed on Feb. 10, 2021. The disclosures of the aforementioned applications are hereby incorporated by reference in their entireties.

TECHNICAL FIELD

This application relates to the field of communication, and more specifically, relates to a communication method and a communication apparatus.

BACKGROUND

A network repository function (NRF) network element may be configured to support a network element service or a network element discovery function, for example, the network repository function network element stores information about a network data analytics function (NWDAF) network element.

A network function (NF) network element that has an NWDAF service requirement sends a network element discovery request to the NRF network element, where the request is used to request information about a target NWDAF network element that meets a preset condition of the NF network element. After receiving the discovery request from the NF network element, the NRF network element provides, for the NF network element, the information about the NWDAF that meets the preset condition of the NF network element and that is determined by the NRF network element. However, a manner of determining and providing the information about the NWDAF by the NRF network element is not provided in the conventional technology.

SUMMARY

This application provides a communication method and a communication apparatus, so that a network repository function network element provides information about a data analytics network element for a service request network element.

According to a first aspect, an embodiment of this application provides a communication method, including: A network repository function network element receives a request message from a service request network element, where the request message is used to request information about a target data analytics network element, the request message includes a first analytics identifier and information about a first service, and the target data analytics network element supports an analytics type corresponding to the first analytics identifier and the first service; the network repository function network element determines the target data analytics network element based on the first analytics identifier, the information about the first service, and association information between the first analytics identifier and the first service that corresponds to the target data analytics network element; and the network repository function network element sends information about the target data analytics network element to the service request network element.

In a possible implementation, the information about the target data analytics network element includes address information of the target data analytics network element, and the address information of the target data analytics network element includes one or more of the following information: an identifier of a data analytics network element, an internet protocol address, a fully qualified domain name, and a uniform resource locator.

In a possible implementation, the first service includes at least one of the following services: a model request service, a model subscription service, a data repository request service, and a data collection coordination service.

In a possible implementation, the analytics type corresponding to the first analytics identifier includes at least one of the following analytics: slice load analytics, service experience analytics, network element load analytics, network performance analytics, terminal mobility analytics, terminal communication analytics, terminal abnormal behavior analytics, user data congestion analytics, and quality of service parameter sustainability analytics.

According to the communication method in this embodiment of this application, when each data analytics network element registers network element information corresponding to the data analytics network element with the network repository function network element, the data analytics network element includes, in the network element information, a correspondence between a service and an analytics type corresponding to an analytics identifier that are supported by the data analytics network element, where the correspondence includes information about one or more services corresponding to each of analytics identities supported by the data analytics network element, or one or more analytics identifiers corresponding to information about each of services supported by the data analytics network element. Therefore, when the service request network element carries a preset condition that needs to be met by a target data analytics network element requested by the service request network element and requests the network repository function network element, where the preset condition refers to the association information between the first analytics identifier and the information about the first service that needs to be included in registered network element information of the target data analytics network element, the network repository function network element can search, based on the association information between the first analytics identifier and the first service, a locally stored data analytics network element for a data analytics network element whose registered network element information includes the association information between the first analytics identifier and the first service, determine the data analytics network element as the target data analytics network element that meets the preset condition of the service request network element, and send information about the determined target data analytics network element to the service request network element. The target data analytics network element determined by the network repository function network element by using the communication method in this application can meet an actual requirement of the service request network element. In other words, the target data analytics network element determined by the network repository function network element by using the communication method in this application can not only support the first service requested by the service request network element, but also support the analytics type corresponding to the first analytics identifier requested by the service request network element.

In some embodiments, the analytics identifier indicates an analytics type, information about the service indicates the service, and the information about the service includes a name of the service.

It should be noted that, each service supported by a data analytics network element may correspond to one or more functions, and each function has a corresponding service. Therefore, in another possible implementation, in the communication method, the correspondence between the analytics identifier and the information about the service may alternatively be replaced with a correspondence between the analytics identifier and information about a function. The correspondence between the analytics identifier and the service may be further determined through a correspondence between the function and the service. Similarly, in the communication method, the correspondence between the analytics identifier and the information about the service may alternatively be replaced with a correspondence between the analytics identifier and another parameter, where there is a correspondence between the another parameter and the service, or there may be a similar replacement relationship for the analytics identifier. It should be understood that regardless of whether the correspondence between the analytics identifier and the service is directly determined or the correspondence between the analytics identifier and the service is indirectly determined, a replacement manner in which the correspondence between the analytics identifier and the service can be substantially determined falls within the protection scope of this application. The correspondence between the analytics identifier and the service is used as an example for description, and should not constitute a limitation on this application.

In a possible implementation, a type of the correspondence carried when the data analytics network element performs registration corresponds to content in the request information sent by the service request network element. For example, the data analytics network element carries the correspondence between the information about the function and the analytics identifier when performing registration. Correspondingly, the request information sent by the service request network element includes information about a first function and the first analytics identifier that need to be supported by the target data analytics network element.

In another possible implementation, a type of the correspondence carried when the data analytics network element performs registration does not necessarily correspond to content in the request information sent by the service request network element. For example, the data analytics network element carries the correspondence between the information about the function and the analytics identifier when performing registration, but the request information sent by the service request network element includes the information about the first service and the first analytics identifier that need to be supported by the target data analytics network element, so that the network repository function network element further needs to obtain the correspondence between the function and the service.

In a possible implementation, the data analytics network element may alternatively register with another network element (for example, a data collection coordination function (DCCF) network element or a data repository function (DRF) network element) having a similar function. Correspondingly, the service request network element may alternatively request, from the another network element (for example, the data collection coordination function network element and the data repository function network element) having the similar function, the information about the target data analytics network element that meets the preset condition of the service request network element.

With reference to the first aspect, in some implementations of the first aspect, the communication method further includes: The network repository function network element receives association information between the first analytics identifier and a second service that corresponds to the target data analytics network element and that is sent by the target data analytics network element.

With reference to the first aspect, in some implementations of the first aspect, the second service includes a plurality of services, the first analytics identifier supports the plurality of services, and the plurality of services include the first service.

In a possible implementation, a storage manner of registered network element information of a data analytics network element in the network repository function network element may be storing one or more analytics identifiers and a list (or a set) of one or more pieces of service information corresponding to each analytics identifier, and/or storing one or more pieces of service information and a list (or a set) of one or more analytics identifiers corresponding to each piece of service information.

In a possible implementation, the second service includes one or more of the following services: a model request service, a model subscription service, a data repository request service, and a data collection coordination service.

With reference to the first aspect, in some implementations of the first aspect, that the network repository function network element determines the target data analytics network element based on the first analytics identifier, the information about the first service, and the association information between the first analytics identifier and the first service that corresponds to the target data analytics network element includes: determining a candidate data analytics network element based on the first analytics identifier, where the candidate data analytics network element supports the analytics type corresponding to the first analytics identifier; and determining the target data analytics network element from the candidate data analytics network element based on the information about the first service and the association information between the first analytics identifier and the first service that corresponds to the target data analytics network element.

According to the communication method in this embodiment of this application, when previously registering with the network repository function network element, the target data analytics network element determined by using the communication method in this application includes, in registered network element information, one or more analytics identifiers and information about one or more services (that is, the second service) corresponding to each analytics identifier that are supported by the target data analytics network element, where the one or more analytics identifiers include the first analytics identifier in the preset condition of the service request network element, and the information about the one or more services corresponding to the first analytics identifier includes the information about the first service. In other words, the registered network element information of the data analytics network element stored in the network repository function network element uses an analytics identifier as a search index, and the information about the one or more services corresponding to each analytics identifier is used as a parameter of the analytics identifier. When the service request network element carries the first analytics identifier and the information about the first service and requests information about the data analytics network element from the network repository function network element, the network repository function network element preferentially determines, based on the first analytics identifier, a candidate data analytics network element whose registered network element information includes the first analytics identifier in a locally registered data analytics network element, further determines, based on the information about the first service and information about a service corresponding to the first analytics identifier in the network element information of the candidate data analytics network element, a data analytics network element that is in the candidate data analytics network element and that supports a correspondence between the analytics type corresponding to the first analytics identifier and the first service, determines the data analytics network element as a target data analytics network element that meets the preset condition of the service request network element, and sends information about the target data analytics network element determined by the network repository function network element to the service request network element. The target data analytics network element determined by the network repository function network element by using the communication method in this application can accurately match an actual requirement of the service request network element. In other words, the target data analytics network element determined by the network repository function network element by using the communication method in this application can not only support the analytics type corresponding to the first analytics identifier requested by the service request network element, but also support the first service requested by the service request network element.

With reference to the first aspect, in some implementations of the first aspect, the communication method further includes: The network repository function network element receives association information between a second analytics identifier and the first service that corresponds to the target data analytics network element and that is sent by the target data analytics network element.

With reference to the first aspect, in some implementations of the first aspect, the second analytics identifier includes a plurality of analytics identifiers, the first service supports the plurality of analytics identifiers, and the plurality of analytics identifiers include the first analytics identifier.

In a possible implementation, analytics type corresponding to the second analytics identifier includes one or more of the following analytics: slice load analytics, service experience analytics, network element load analytics, network performance analytics, terminal mobility analytics, terminal communication analytics, terminal abnormal behavior analytics, user data congestion analytics, and quality of service parameter sustainability analytics.

With reference to the first aspect, in some implementations of the first aspect, that the network repository function network element determines the target data analytics network element based on the first analytics identifier, the information about the first service, and the association information between the first analytics identifier and the first service that corresponds to the target data analytics network element includes: The network repository function network element determines a candidate data analytics network element based on the information about the first service, where the candidate data analytics network element supports the first service; and the network repository function network element determines the target data analytics network element from the candidate data analytics network element based on the first analytics identifier and the association information between the first analytics identifier and the first service that corresponds to the target data analytics network element.

According to the communication method in this embodiment of this application, when previously registering with the network repository function network element, the target data analytics network element determined by using the communication method in this application includes, in registered network element information, information about one or more services and one or more analytics identifiers (that is, the second analytics identifier) corresponding to information about each service that are supported by the target data analytics network element, where the information about the one or more services includes the information about the first service in the preset condition of the service request network element, and the one or more analytics identifiers corresponding to the information about the first service include the first analytics identifier. In other words, the registered network element information of the data analytics network element stored in the network repository function network element uses information about a service as a search index, and the one or more analytics identifiers corresponding to information about each service are used as parameters of the information about the service. When the service request network element carries the first analytics identifier and the information about the first service and requests information about the data analytics network element from the network repository function network element, the network repository function network element preferentially determines, based on the information about the first service, a candidate data analytics network element whose registered network element information includes the information about the first service in a locally registered data analytics network element, further determines, based on the first analytics identifier and an analytics identifier corresponding to the information about the first service in the network element information of the candidate data analytics network element, a data analytics network element that is in the candidate data analytics network element and that supports a correspondence between the first service and the analytics type corresponding to the first analytics identifier, determines the data analytics network element as a target data analytics network element that meets the preset condition of the service request network element, and sends information about the target data analytics network element determined by the network repository function network element to the service request network element. The target data analytics network element determined by the network repository function network element by using the communication method in this application can accurately match an actual requirement of the service request network element. In other words, the target data analytics network element determined by the network repository function network element by using the communication method in this application can not only support the first service requested by the service request network element, but also support the analytics type corresponding to the first analytics identifier requested by the service request network element.

With reference to the first aspect, in some implementations of the first aspect, the request information sent by the service request network element further includes network element type information of the service request network element; and before the determining the target data analytics network element based on the first analytics identifier, the information about the first service, and association information between the first analytics identifier and the first service that corresponds to the target data analytics network element, the method further includes: determining that the service request network element is a data analytics network element based on the network element type information of the service request network element.

According to the communication method in this embodiment of this application, when registering with the network repository function network element, each data analytics network element includes, in registered network element information, a correspondence between information about a service supported by the data analytics network element and a network element type and a correspondence between the information about the service and an analytics identifier that are supported by the data analytics network element. The request information sent by the service request network element to the network repository function not only includes the first analytics identifier and the information about the first service that need to be supported by the target data analytics network element, but also needs to include the network element type information of the service request network element. After receiving the request information, the network repository function network element first determines a network element type of the service request network element, and further determines the target data analytics network element according to the method if the network element type of the service request network element is a data analytics network element, that is, determines the target data analytics network element based on the first analytics identifier, the information about the first service, and the association information between the first analytics identifier and the first service that corresponds to the target data analytics network element. Otherwise, if the network element type of the service request network element is a non-data analytics network element, the network repository function network element may no longer search for the target data analytics network element based on the correspondence between the first analytics identifier and the first service, and may determine a data analytics network element whose analytics identifier includes the first analytics identifier and whose service information includes the information about the first service as the target data analytics network element. In this case, a type of the first service is an analytics result exposure service. The target data analytics network element determined by the network repository function network element by using the communication method in this application can not only support the first service requested by the service request network element, but also support the analytics type corresponding to the first analytics identifier requested by the service request network element. According to the communication method in this embodiment of this application, the target data analytics network element that meets the actual requirement of the service request network element can be determined, and service continuity of the service request network element can be ensured. In addition, the communication method in this embodiment of this application can be further compatible with the second release of the 5G standard.

With reference to the first aspect, in some implementations of the first aspect, the request information sent by the service request network element further includes information indicating an association relationship between the first analytics identifier and the information about the first service.

In some embodiments, the service request network element simultaneously requests a plurality of target data analytics network elements from the network repository function network element, or one target data analytics network element requested by the service request network element needs to support a plurality of first analytics identifiers and a plurality of first services. In this case, the request information sent by the service request network element further needs to include association information between information about the plurality of first services and the plurality of first analytics identifiers that need to be supported by the target data analytics network element requested by the service request network element. Therefore, the network repository function network element can accurately find, based on the association information in the request information, the target data analytics network element that meets the association information in local storage information, and send the target data analytics network element to the service request network element, so that a service of the service request network element can be ensured.

It should be noted that, there may be one or more target data analytics network elements that meet the preset condition of the service request network element and that are determined by the network repository function network element based on the request information of the service request network element. Correspondingly, the information about the target data analytics network element sent by the network repository function network element may also include information about one or more data analytics network elements. This is not limited in this application.

It should be further noted that, if the information about the target data analytics network element sent by the network repository function network element includes information about a plurality of target data analytics network elements, the service request network element may select information about any data analytics network element from the information about the plurality of target data analytics network elements.

According to a second aspect, an embodiment of this application provides a communication method, including: A service request network element sends a request message to a network repository function network element, where the request message is used to request information about a target data analytics network element, the request message includes a first analytics identifier and information about a first service, and the target data analytics network element supports an analytics type corresponding to the first analytics identifier and the first service; and the service request network element receives the information about the target data analytics network element from the network repository function network element.

In a possible implementation, the information about the target data analytics network element includes address information of the target data analytics network element, and the address information of the target data analytics network element includes one or more of the following information: an identifier of a data analytics network element, an internet protocol address, a fully qualified domain name, and a uniform resource locator.

In a possible implementation, the first service includes at least one of the following services: a model request service, a model subscription service, a data repository request service, and a data collection coordination service.

In a possible implementation, the analytics type corresponding to the first analytics identifier includes at least one of the following analytics: slice load analytics, service experience analytics, network element load analytics, network performance analytics, terminal mobility analytics, terminal communication analytics, terminal abnormal behavior analytics, user data congestion analytics, and quality of service parameter sustainability analytics.

According to the communication method in this embodiment of this application, when requesting, from the network repository function network element, information about a target data analytics network element that meets a preset condition of the service request network element, the service request network element includes, in the request information sent by the service request network element, the first analytics identifier and the information about the first service that corresponds to the preset condition. Therefore, the network repository function network element can determine, based on the first analytics identifier, the information about the first service, and registered network element information of a data analytics network element locally stored in the network repository function network element, the information about the target data analytics network element that meets the preset condition of the service request network element, where the registered network element information of the data analytics network element locally stored in the network repository function network element includes a correspondence between a service and an analytics identifier that are supported by each data analytics network element. Therefore, the service request network element can receive the information about the target data analytics network element that meets the preset condition of the service request network element. This resolves a problem that a data analytics network element determined by the network repository function network element cannot support both the analytics type corresponding to the first analytics identifier and the first service, so that information about the data analytics network element received by the service request network element can accurately match the information of the target data analytics network element, thereby ensuring a service of the service request network element.

In some embodiments, the analytics identifier indicates an analytics type, information about the service indicates the service, and the information about the service includes a name of the service.

It should be noted that, each service supported by a data analytics network element may correspond to one or more functions, and each function has a corresponding service. Therefore, in another possible implementation, in the communication method, the information about the first service in the request information sent by the service request network element may alternatively be replaced with information about a first function. The first function corresponds to the first service, and a correspondence between an analytics identifier and a service may be further determined through a correspondence between the function and the service. Similarly, in the communication method, the correspondence between the analytics identifier and the information about the service may alternatively be replaced with a correspondence between the analytics identifier and another parameter, where there is a correspondence between the another parameter and the service, or there may be a similar replacement relationship for the analytics identifier. It should be understood that regardless of whether the correspondence between the analytics identifier and the service is directly determined or the correspondence between the analytics identifier and the service is indirectly determined, a replacement manner in which the correspondence between the analytics identifier and the service can be substantially determined falls within the protection scope of this application. The correspondence between the analytics identifier and the service is used as an example for description, and should not constitute a limitation on this application.

In a possible implementation, a type of the correspondence carried when the data analytics network element performs registration corresponds to content in the request information sent by the service request network element. For example, the data analytics network element carries the correspondence between the information about the function and the analytics identifier when performing registration. Correspondingly, the request information sent by the service request network element includes information about a first function and the first analytics identifier that need to be supported by the target data analytics network element.

In another possible implementation, a type of the correspondence carried when the data analytics network element performs registration does not necessarily correspond to content in the request information sent by the service request network element. For example, the data analytics network element carries the correspondence between the information about the function and the analytics identifier when performing registration, but the request information sent by the service request network element includes the information about the first service and the first analytics identifier that need to be supported by the target data analytics network element, so that the network repository function network element further needs to obtain the correspondence between the function and the service.

In a possible implementation, the service request network element may alternatively request, from another network element (for example, a data collection coordination function (DCCF) network element or a data repository function (DRF) network element) having a similar function, the information about the target data analytics network element that meets the preset condition of the service request network element. Correspondingly, the data analytics network element may alternatively register with the another network element (for example, the data collection coordination function network element and the data repository function network element) having the similar function.

With reference to the second aspect, in some implementations of the second aspect, the request information sent by the service request network element further includes network element type information of the service request network element, and the service request network element requests information about the target data analytics network element.

According to the communication method in this embodiment of this application, in addition to including the first analytics identifier corresponding to the first analytics type and the information about the first service corresponding to the first service that are supported by the target data analytics network element that meets the preset condition of the service request network element, the request information sent by the service request network element further includes the network element type information of the service request network element. After receiving the request information, the network repository function network element first determines a network element type of the service request network element, and further determines the target data analytics network element according to the method if the network element type of the service request network element is a data analytics network element, that is, determines the target data analytics network element based on the first analytics identifier, the information about the first service, and the association information between the first analytics identifier and the first service that corresponds to the target data analytics network element. Otherwise, if the network element type of the service request network element is a non-data analytics network element, the network repository function network element may no longer search for the target data analytics network element based on the correspondence between the first analytics identifier and the first service, and may determine a data analytics network element whose analytics identifier includes the first analytics identifier and whose service information includes the information about the first service as the target data analytics network element. In this case, a type of the first service is an analytics result exposure service. The target data analytics network element determined by the network repository function network element by using the communication method in this application can not only support the first service requested by the service request network element, but also support the analytics type corresponding to the first analytics identifier requested by the service request network element. According to the communication method in this embodiment of this application, the target data analytics network element that meets the actual requirement of the service request network element can be determined, and service continuity of the service request network element can be ensured. In addition, the communication method in this embodiment of this application can be further compatible with the second release of the 5G standard.

With reference to the second aspect, in some implementations of the second aspect, the request information sent by the service request network element further includes information indicating an association relationship between the first analytics identifier and the information about the first service.

In some embodiments, the service request network element simultaneously requests a plurality of target data analytics network elements from the network repository function network element, or one target data analytics network element requested by the service request network element needs to support a plurality of first analytics identifiers and a plurality of first services. In this case, the request information sent by the service request network element further needs to include association information between information about the plurality of first services and the plurality of first analytics identifiers that need to be supported by the target data analytics network element requested by the service request network element. Therefore, the network repository function network element can accurately find, based on the association information in the request information, the target data analytics network element that meets the association information in local storage information, and send the target data analytics network element to the service request network element, so that a service of the service request network element can be ensured.

It should be further noted that, if the information about the target data analytics network element received by the service request network element includes information about a plurality of target data analytics network elements, the service request network element may select information about any data analytics network element from the information about the plurality of target data analytics network elements.

According to a third aspect, an embodiment of this application provides a communication method, including: A target data analytics network element sends association information between a first analytics identifier and a first service that corresponds to the target data analytics network element to a network repository function network element.

In some embodiments, the association information between the first analytics identifier and the first service is specifically reflected as a correspondence between the first analytics identifier and information about the first service. The first analytics identifier indicates an analytics type of the first analytics, the information about the first service indicates the first service, and the information about the first service includes a service name of the first service.

In a possible implementation, the first service includes at least one of the following services: a model request service, a model subscription service, a data repository request service, and a data collection coordination service.

In a possible implementation, the analytics type corresponding to the first analytics identifier includes at least one of the following analytics: slice load analytics, service experience analytics, network element load analytics, network performance analytics, terminal mobility analytics, terminal communication analytics, terminal abnormal behavior analytics, user data congestion analytics, and quality of service parameter sustainability analytics.

With reference to the third aspect, in some implementations of the third aspect, that the target data analytics network element sends the association information between the first analytics identifier and the first service that corresponds to the target data analytics network element to the network repository function network element includes: The target data analytics network element sends association information between the first analytics identifier and a second service that corresponds to the target data analytics network element to the network repository function network element, where the second service includes a plurality of services, the first analytics identifier supports the plurality of services, and the plurality of services include the first service.

In a possible implementation, the second service includes one or more of the following services: a model request service, a model subscription service, a data repository request service, and a data collection coordination service.

With reference to the third aspect, in some implementations of the third aspect, that the target data analytics network element sends the association information between the first analytics identifier and the first service that corresponds to the target data analytics network element to the network repository function network element includes: The target data analytics network element sends association information between a second analytics identifier and the first service that corresponds to the target data analytics network element to the network repository function network element, where the second analytics identifier includes a plurality of analytics identifiers, the first service supports the plurality of analytics identifiers, and the plurality of analytics identifiers include the first analytics identifier.

In a possible implementation, analytics type corresponding to the second analytics identifier includes one or more of the following analytics: slice load analytics, service experience analytics, network element load analytics, network performance analytics, terminal mobility analytics, terminal communication analytics, terminal abnormal behavior analytics, user data congestion analytics, and quality of service parameter sustainability analytics.

According to the communication method in this embodiment of this application, when each data analytics network element registers network element information corresponding to the data analytics network element with the network repository function network element, the data analytics network element includes, in the network element information, a correspondence between a service and an analytics type corresponding to an analytics identifier that are supported by the data analytics network element, where the correspondence includes information about one or more services corresponding to each of analytics identifiers supported by the data analytics network element, or one or more analytics identifiers corresponding to information about each of services supported by the data analytics network element. Similarly, when registering network element information corresponding to the target data analytics network element with the network repository function network element, the target data analytics network element includes, in the network element information, a correspondence between a service and an analytics type corresponding to an analytics identifier that are supported by the data analytics network element. The analytics identifier supported by the target data analytics network element includes the first analytics identifier, and one or more services (that is, the second service) corresponding to the first analytics identifier include the first service, or the service supported by the target data analytics network element includes the first service, and one or more analytics identifiers (that is, the second analytics identifier) corresponding to the information about the first service include the first analytics identifier.

Therefore, the network repository function network element can search, based on the association information between the first analytics identifier and the first service, a locally stored data analytics network element for a data analytics network element whose registered network element information includes the association information between the first analytics identifier and the first service, and find the target data analytics network element from the at least one data analytics network element. The network repository function network element can accurately find, by using the communication method in this application, the target data analytics network element that can meet both the first analytics type corresponding to the first analytics identifier and the first service, thereby resolving a problem that the data analytics network element determined by the network repository function network element does not match the data analytics network element.

In a possible implementation, the data analytics network element may alternatively register with another network element (for example, a data collection coordination function (DCCF) network element or a data repository function (DRF) network element) having a similar function. Correspondingly, the service request network element may alternatively request, from the another network element (for example, the data collection coordination function network element and the data repository function network element) having the similar function, the information about the target data analytics network element that meets the preset condition of the service request network element.

In a possible implementation, a format of registered network element information sent by a data analytics network element may be sending one or more analytics identifiers and a list (or a set) of one or more pieces of service information corresponding to each analytics identifier, and/or sending one or more pieces of service information and a list (or a set) of one or more analytics identifiers corresponding to each piece of service information.

According to a fourth aspect, a communication apparatus is provided. The apparatus may be configured to perform operations of a communication device in the first aspect and any possible implementation of the first aspect. Specifically, the communication apparatus includes a corresponding component (means) configured to perform the steps or the functions described in the first aspect, and the component may be a first communication device in the first aspect. The steps or the functions may be implemented by using software, hardware, or a combination of hardware and software.

According to a fifth aspect, a communication apparatus is provided. The apparatus may be configured to perform operations of a communication device in the second aspect and any possible implementation of the second aspect. Specifically, the apparatus may include a corresponding component (means) configured to perform the steps or the functions described in the second aspect. The steps or the functions may be implemented by using software, hardware, or a combination of hardware and software.

According to a sixth aspect, a communication apparatus is provided. The apparatus may be configured to perform operations of a communication device in the third aspect and any possible implementation of the third aspect. Specifically, the communication apparatus includes a corresponding component (means) configured to perform the steps or the functions described in the third aspect, and the component may be a first communication device in the third aspect. The steps or the functions may be implemented by using software, hardware, or a combination of hardware and software.

According to a seventh aspect, a computer-readable medium is provided, where the computer-readable medium stores a computer program (which may also be referred to as code or an instruction), and when the computer program is run on a computer, the computer is enabled to perform the method according to any possible implementation of the first aspect to the third aspect.

According to an eighth aspect, a chip system is provided. The chip system includes a memory and a processor. The memory is configured to store a computer program, and the processor is configured to invoke the computer program from the memory and run the computer program, to enable a communication device on which the chip system is installed to perform the method according to any possible implementation of the first aspect to the third aspect.

According to a ninth aspect, a chip is provided, where the chip includes a processor and a communication interface. The communication interface is configured to communicate with an external component or an internal component, and the processor is configured to implement the method in any possible implementation of the first aspect to the third aspect.

In a possible implementation, the chip may further include a memory. The memory stores instructions. The processor is configured to execute the instructions stored in the memory or other instructions. When the instructions are executed, the processor is configured to implement the method in any possible implementation of the first aspect to the third aspect. In a possible implementation, the chip may be integrated into an access network device.

According to a tenth aspect, a computer program product is provided, where the computer program product includes: a computer program (which may also be referred to as code or an instruction), and when the computer program is run, a computer is enabled to perform the method according to any possible implementation of the first aspect to the third aspect.

According to an eleventh aspect, a communication device is provided, including a processor and a memory, where the memory is configured to store a computer program, and the processor is configured to invoke the computer program from the memory and run the computer program, to enable the communication apparatus to perform the communication method in any possible implementation of the first aspect to the third aspect.

There are one or more processors, and there are one or more memories. The memory may be integrated with the processor, or the memory and the processor may be disposed separately.

In a possible design, a communication device is provided, including a communication interface, a processor, and a memory. The processor is configured to control the communication interface to send and receive a signal. The memory is configured to store a computer program. The processor is configured to invoke the computer program from the memory and run the computer program, to enable the communication device to perform the method in any possible implementation of the first aspect to the third aspect.

According to a twelfth aspect, a communication system is provided, where the communication system includes: a network repository function network element, configured to perform the method in any possible implementation of the first aspect; and a service request network element, configured to perform the method in any possible implementation of the second aspect.

According to a thirteenth aspect, a communication system is provided, where the communication system includes at least two network elements of a service request network element, a network repository function network element, and a data analytics network element.

DESCRIPTION OF EMBODIMENTS

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) system, a future 5.5th generation (5.5G) system, a 6 generation (6G) system, or a new radio (NR) system.

Figures 1, 2:
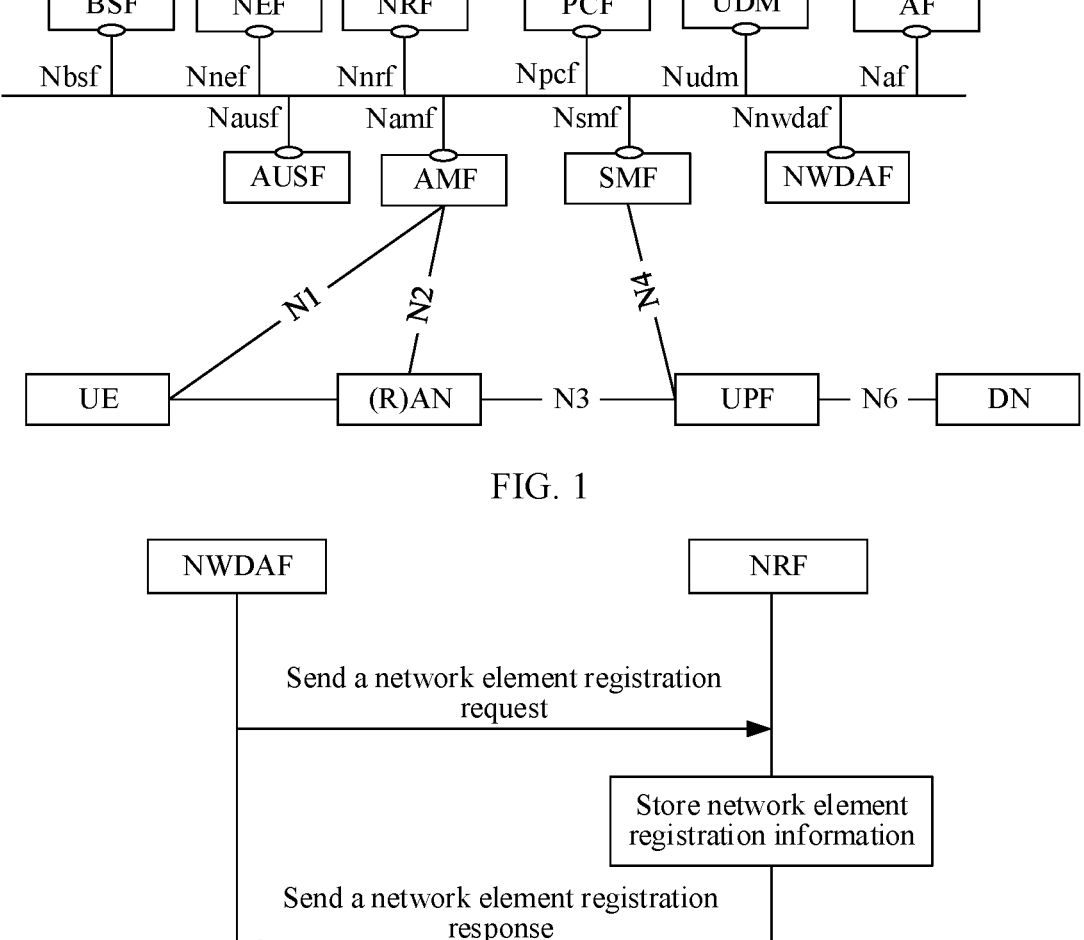
FIG. 1 is a schematic diagram of an application scenario to which a method according to an embodiment of this application is applicable.
FIG. 2 is a schematic flowchart in which a data analytics network element registers with a network repository function network element.

The following uses a fifth generation system as an example to describe, with reference to FIG. 1, a network architecture to which this application is applicable.

As shown in FIG. 1, the communication system includes but is not limited to the following network elements.

1. Terminal Device

The terminal device in this embodiment of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user device, or the like.

The terminal device may be a device providing voice and/or data connectivity for a user. For example, the terminal device is a handheld device or a vehicle-mounted device that has a wireless connection function. Currently, examples of some terminals are as follows: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self-driving or autopilot, a wireless terminal in remote medical surgery, a wireless terminal in a smart grid (smart grid), a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in embodiments of this application.

By way of example but not limitation, in embodiments of this application, the terminal device may alternatively be a wearable device. The wearable device may also be referred to as a wearable intelligent device, and is a generic term for wearable device such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bracelets or smart jewelry for monitoring physical signs. In addition, in embodiments of this application, the terminal device may alternatively be a terminal device in an internet of things (IoT) system.

In addition, in embodiments of this application, the terminal device may further communicate with a terminal device in another communication system, for example, the terminal device performs inter-device communication. For example, the terminal device may further transmit (for example, send and/or receive) a time synchronization packet with the terminal device in the another communication system.

2. Radio Access Network (RAN)

The radio access network is an access network that implements an access network function based on a wireless communication technology. The radio access network can manage a radio resource, and provide a wireless access service or air interface access service to a terminal, to forward a control signal and user data between the terminal and a core network.

By way of example but not limitation, the radio access network may be an evolved NodeB (evolved NodeB, eNB or eNodeB) in the LTE system, or may be a radio controller in a cloud radio access network (CRAN) scenario. Alternatively, the radio access network may be a relay station, an access point, a vehicle-mounted device, a wearable device, an access device in a 5G network, an access device in a future evolved PLMN network, or the like, or may be an access point (AP) in a WLAN, or may be a gNB in an NR system. This is not limited in embodiments of this application.

3. Network Data Analytics Function (NWDAF) Network Element

The network data analytics function network element NWDAF has at least one of the following functions: a data collection function, a model training function, a model feedback function, an analytics result inference function, an analytics result feedback function, a data repository function, and a data collection coordination function. The data collection function is used to collect data from a network element, a third-party service server, a terminal device, or a network management system. The model training function is used to perform analytics and training based on related input data to obtain a model. The model feedback function is used to send a trained machine learning model to a network element that supports an inference function. The analytics result inference function is used to perform inference based on the trained machine learning model and inference data to determine a data analytics result. The analytics result feedback function may provide the data analytics result to the network element, the third-party service server, the terminal device, or the network management system. The analytics result may assist a network in selecting a quality of service parameter of a service, or assist a network in performing traffic routing, or assist a network in selecting a background traffic transmission policy, or the like. The data repository function means that the NWDAF network element may locally store training data or inference data. The data collection coordination function means that the NWDAF network element may assist another NWDAF network element in obtaining data on an NF. For example, the another NWDAF network element (for example, an NWDAF X) may first request the data on the NF from the NWDAF network element. If the NWDAF network element already stores the data on the NF, the NWDAF network element directly sends the data to the NWDAF X network element. Otherwise, the NWDAF network element first requests the data on the NF from the NF, and then sends the obtained data on the NF to the NWDAF X network element.

The typical application scenarios of the NWDAF include: Terminal parameter customization or optimization, that is, the NWDAF collects information about user connection management, mobility management, session management, an accessed service, and the like, evaluates and analyzes users of different types by using a reliable analytics and prediction model to construct user profiles, determines moving tracks and service usage habits of the users, and predicts user behaviors. A 5G network optimizes a user mobility management parameter, a radio resource management parameter, and the like based on the analyzed and predicted data. Service (path) optimization, that is, the NWDAF collects information such as network performance, service load in a specific area, user service experience, and the like, evaluates and analyzes services of different types by using a reliable network performance analytics and prediction model, to construct service profiles, determines an internal association of quality of experience (QoE) of a service, service experience, a service path, a 5G quality of service (QoS) parameter, or the like, and optimizes the service path, service routing, 5G edge computing, 5G QoS corresponding to the service, and the like. Optimization of a service parameter by an AF. For example, the Internet of Vehicles is an important technology of a 5G network. In an automatic driving scenario of the Internet of Vehicles, prediction of network performance (for example, QoS information and service load) of a base station that a vehicle is about to pass through plays an important role in improving quality of service of the Internet of Vehicles. For example, a server of the Internet of Vehicles may determine, based on predicted information of the network performance, whether to continue to maintain an unmanned driving mode. The NWDAF collects information about the network performance, the service load in the specific area, and the like, and collects statistics on and predicts the network performance by using a reliable network performance analytics and prediction model, helping the AF optimize the parameter.

In this embodiment of this application, the NWDAF may be an independent network element, or may be integrated with another network element. For example, the NWDAF network element may be integrated with an AMF or integrated with a session management function (SMF) network element.

4. Network Repository Function (NRF) Network Element

The network repository function network element may be configured to support a network element service or a network element discovery function, receive an NF discovery request from a network function (NF) instance, provide information about a discovered NF instance to the NF instance, and support and maintain an available NF instance and an NF configuration file of a service supported by the available NF instance. In this embodiment of this application, the network repository function network element may be configured to support the network element service or the network element discovery function.

5. Session Management Function (SMF) Network Element

The session management function network element is mainly used for session management, allocation and management of an internet protocol (IP) address of a terminal device, selection of a manageable user plane function (UPF) network element, policy control and termination of a charging functional interface, downlink data notification, and the like. In this embodiment of this application, the session management function network element may be configured to implement a function of a session management network element.

6. Access and Mobility Management Function (AMF) Network Element

The access and mobility management function network element is mainly used for mobility management, access management, and the like, and may be configured to implement a function in a mobility management entity (MME) function other than a session management function, for example, a lawful interception function and an access authorization (or authentication) function. In this embodiment of this application, the access and mobility management function network element may be configured to implement a function of an access and mobility management network element.

7. Policy Control Function (PCF) Network Element

The policy control function network element is configured to guide a unified policy framework of a network behavior, and provide policy rule information and the like for a control plane function network element (for example, the AMF network element or the SMF network element).

8. Application Function (AF) Network Element

The application function network element is configured to provide a service, or is configured to perform application-affected data routing, access a network exposure function network element, or exchange service data with the NWDAF network element to perform policy control, or the like.

9. User Plane Function (UPF) Network Element

The user plane function network element may be used for packet routing and forwarding, QoS parameter processing of user plane data, or the like. User data may be accessed to a data network (DN) via this network element. In this embodiment of this application, the user plane function network element may be configured to implement a function of a user plane network element.

10. Network exposure function (NEF) network element

The network exposure function network element is configured to expose, to the outside, a service, network capability information (for example, a terminal location and whether a session is reachable), and the like provided by a 3GPP network function, and the like.

In the foregoing network architecture, an N2 interface is an interface between the RAN and the AMF network element and is configured to send a radio parameter, non-access stratum (NAS) signaling, and the like. An N3 interface is an interface between the RAN and the UPF network element and is configured to transmit user plane data or the like. An N4 interface is an interface between the SMF network element and the UPF network element and is configured to transmit information such as a service policy, tunnel identifier information of an N3 connection, data buffering indication information, and a downlink data notification message. An N6 interface is an interface between the DN network element and the UPF network element and is configured to transmit user plane data or the like.

It should be understood that, in the foregoing network architecture, the NWDAF network element may exchange information with any other network element via a servitization interface. For example, the NWDAF network element collects, from another network element (for example, the AMF or the SMF) via the servitization interface, data generated by a terminal on the network element, and provides a data analytics result (Analytics), a model (Machine Learning Model, also referred to as a machine learning model), data, and the like for another network element (for example, the AMF or the PCF) via an Nnwdaf interface.

It should be understood that the foregoing network architecture applied to embodiments of this application is merely an example of a network architecture described from a perspective of a conventional point-to-point architecture and a servitization architecture, and a network architecture applicable to embodiments of this application is not limited thereto. Any network architecture that can implement functions of the foregoing network elements is applicable to embodiments of this application.

It should be understood that names of the interfaces between the network elements in FIG. 1 are merely an example, and the interfaces may have other names during specific implementation. This is not specifically limited in this application. In addition, a name of information (or signaling) transmitted between the foregoing network elements is merely an example, and does not constitute any limitation on a function of the information.

It should be noted that, the foregoing network element may also be referred to as an entity, a device, an apparatus, a module, or the like. This is not particularly limited in this application. In addition, in this application, for ease of understanding and description, the description of the network element is omitted in some descriptions. For example, the NWDAF network element is referred to as an NWDAF for short. In this case, the "NWDAF" should be understood as the NWDAF network element. Same or similar cases are not described below.

It may be understood that the foregoing function network element may be a network element in a hardware device, or may be a software function running on dedicated hardware, or may be a virtualization function instantiated on a platform (for example, a cloud platform).

It can be understood that in the communication system shown in FIG. 1, functions of various composition network elements are merely an example. When the various composition network elements are used in embodiments of this application, not all functions are necessarily required.

An NRF in FIG. 1 is a network repository function network element, and a function of the NRF is similar to a domain name server (DNS) in a conventional network. Each network element may register network element information (NF Profile) with the NRF. The NRF may assist another network element in obtaining information about a related network element that meets a requirement of the another network element.

The following uses the NWDAF as an example to describe in detail a process in which the NWDAF registers with the NRF with reference to FIG. 2.

Step 1: The NWDAF carries network element information of the NWDAF (NWDAF profile), triggers a network element registration request (Nnrf_NFManagement_NFRegister_request) service operation in network element management over an Nnrf interface, and initiates an NWDAF network element registration request to the NRF to register the network element information of the NWDAF.

In a possible implementation, Table 1 shows information content included in the network element information of the NWDAF (NWDAF profile) as follows:

TABLE 1

| Attribute name (attribute name) | Data type (data type) | Presence necessity of attributes (presence, P) | Cardinality (cardinality) |
|---|---|---|---|
| NWDAF network element specific information (nwdafInfo) | NWDAF network element specific information data type (NwdafInfo) | Optional (optional, O) | 0 or 1 (0 or 1) |
| Information about a network element service (nfServices) | Network element service list (array(NFService)) | Optional (optional, O) | 1 or N (1 or N) |

Further, content included in NnwdafInfo in Table 1 is shown in Table 2 as follows:

TABLE 2

| Attribute name (attribute name) | Data type (data type) | Presence necessity of attributes (presence, P) | Cardinality (cardinality) |
|---|---|---|---|
| Analytics identifier supported by the NWDAF (eventIds) | Analytics identifier list supported by the NWDAF (array(EventId)) | Conditional (conditional, C) | 1 or N (1 or N) |
| Analytics identifier supported by the NWDAF (nwdafEvents) | Analytics identifier list supported by the NWDAF (array(NwdafEvent) | Conditional (conditional, C) | 1 or N (1 or N) |

Content included in NFService (the information about the network element service) in Table 1 is shown in Table 3 as follows:

TABLE 3

| Attribute name (attribute name) | Data type (data type) | Presence necessity of attributes (presence, P) | Cardinality (cardinality) |
|---|---|---|---|
| Service instance identifier (serviceInstanceId) | String (string) | Mandatory (mandatory, M) | 1 (1) |
| Service name (serviceName) | Service name data type (ServiceName) | Mandatory (mandatory, M) | 1 (1) |

It should be noted that, for the information about the network service in the present invention, refer to the content in Table 3. For example, it is assumed that a network element is the NWDAF network element, information about an Nnwdaf_AnalyticsSubscription service supported by the NWDAF includes a service instance identifier of the Nnwdaf_AnalyticsSubscription service or a service name (that is, Nnwdaf_AnalyticsSubscription) of the Nnwdaf_AnalyticsSubscription service. For another service of the NWDAF, refer to the description herein. Details are not described again.

Still further, in Table 3, the service name (ServiceName) includes two types: an analytics result subscription service (Nnwdaf_AnalyticsSubscription) of the NWDAF network element and/or an analytics result information service (Nnwdaf_AnalyticsInfo) of the NWDAF network element.

EventId in Table 2 corresponds to an Analytics ID. Table 4 shows an example of related content of the Analytics ID.

TABLE 4

| Analytics information (Analytics Information) | Description (Description) |
|---|---|
| Slice load level information (Slice Load level information) | Analytics identifier: load level information (Analytics ID: load level information) |
| Observed service experience information (Observed Service experience information) | Analytics identifier: service experience (Analytics ID: Service Experience) |
| Network element load information (NF Load information) | Analytics identifier: network element load information (Analytics ID: NF load information) |
| Network performance information (Network Performance information) | Analytics identifier: network performance (Analytics ID: Network Performance) |
| Terminal mobility information (UE mobility information) | Analytics identifier: terminal mobility (Analytics ID: UE Mobility) |
| Terminal communication information (UE Communication information) | Analytics identifier: terminal communication (Analytics ID: UE Communication) |
| Terminal behavioral parameters expected by a network side (Expected UE behavioral parameters) | Analytics identifier: terminal mobility and/or terminal communication (Analytics ID: UE Mobility and/or UE Communication) |
| Abnormal terminal behavior information (UE Abnormal behavior information) | Analytics identifier: abnormal behavior (Analytics ID: Abnormal behavior) |
| User data congestion information (User Data Congestion information) | Analytics identifier: user data congestion (Analytics ID: User Data Congestion) |
| QoS sustainability (QOS Sustainability) | Analytics identifier: QoS sustainability (Analytics ID: QOS Sustainability) |

It should be noted that, in the present invention, if information about the NWDAF includes any one or more analytics identifiers in Table 4, an analytics type corresponding to the one or more analytics identifiers supported by the NWDAF is identified, for example, Analytics ID=Service Experience. The NWDAF provides data analytics of the service experience type. Correspondingly, the NWDAF may provide an NWDAF service (for example, the analytics result subscription service, for details, refer to Table 5) or (for details, refer to Table 5) an NWDAF function (for example, an analytics result inference function, for details, refer to Table 6) corresponding to the service experience type.

Step 2: After receiving the registration request, the NRF stores the network element information (NWDAF profile) of the NWDAF registered by the NWDAF.

Step 3: The NRF triggers a network element registration response (Nnrf_NFManagement_NFRegister_response) service operation in the network element management over the Nnrf interface, and sends reply information to the NWDAF, to notify the NWDAF that the registration succeeds.

Figure 3:
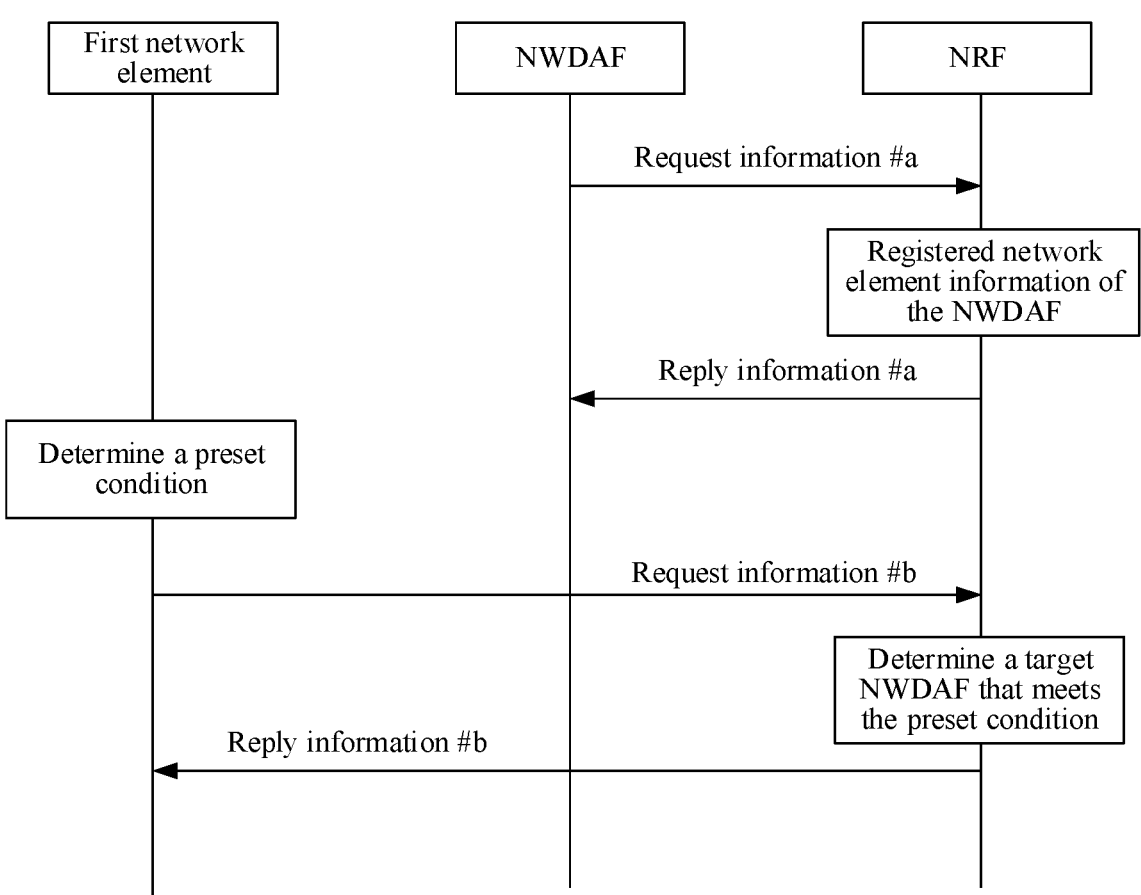
FIG. 3 is a schematic flowchart in which a first network element requests information about a data analytics network element from a network repository function network element.

The following still uses the NWDAF as an example. With reference to FIG. 3, a process in which the NRF assists another network element in discovering an NWDAF that meets a requirement of the another network element after the NWDAF completes registration with the NRF is described in detail.

Step 1: A first network element (that is, a service request network element) triggers a network element discovery request (Nnrf_NFDiscovery_Request) service operation over an Nnrf interface, and sends request information to the NRF, where the request information is used to request address information of an NWDAF that meets a preset condition of the first network element, the request information includes preset condition information of the first network element, and the preset condition information includes an analytics identifier (Analytics ID) and a service name.

In a possible implementation, in the preset condition information, the analytics identifier Analytics ID includes the content shown in Table 4. The service name Service Name includes the analytics result subscription service (Nnwdaf_AnalyticsSubscription) of the NWDAF network element or the analytics result information service (Nnwdaf_AnalyticsInfo) of the NWDAF network element.

Step 2: The NRF receives the request information, and determines address information, for example, an identifier of information includes the address information of the NWDAF that meets the preset condition of the first network element.

It should be understood that the first network element is a network element that has a requirement for the address information of the NWDAF, for example, a PCF network element that uses an analytics result exposure service.

It can be learned from the foregoing description in which the NRF assists the first network element in discovering the NWDAF that meets the requirement of the first network element that the NRF determines, based on the analytics identifier (Analytics ID) and the service name in the request information sent by the first network element, the NWDAF that meets the preset condition of the first network element.

In the second version (3GPP Rel-16) of the 5G standard, a service name provided by the NWDAF for an analytics identifier (Analytics ID) includes only an analytics result exposure service, that is, the analytics result subscription service (Nnwdaf_AnalyticsSubscription) of the NWDAF network element or the analytics result information service (Nnwdaf_AnalyticsInfo) of the NWDAF network element. The analytics result exposure service corresponds to a plurality of functions such as data collection, model training, and analytics result inference, that is, the functions such as data collection, model training, and analytics result inference jointly provide service output for the analytics result exposure service.

As the third version (3GPP Rel-17) of the 5G standard is proposed, the service type and the functions provided by the NWDAF for an analytics identifier (Analytics ID) are also changed. For a same analytics identifier Analytics ID, the NWDAF supports the analytics result exposure service, and also newly adds another service type. The service type provided by the NWDAF for the same analytics identifier Analytics ID in the Rel-17 phase is shown in Table 5:

TABLE 5

| Service type | Service name |
|---|---|
| Analytics result exposure service | Analytics result subscription service (Nnwdaf_AnalyticsSubscription) of the NWDAF network element or analytics result information service (Nnwdaf_AnalyticsInfo) of the NWDAF network element |
| Model exposure service (newly added in Rel-17) | Machine learning model exposure service (Nnwdaf_MLModelProvision) of the NWDAF network element (Provision may alternatively be replaced with Subscription, subscription) or machine learning model information service (Nnwdaf_MLModelINfoNWDAF) of the network element |
| Data repository service (newly added in Rel-17) | Data repository service (Nnwdaf_DataRepository) of the NWDAF network element |
| Data collection coordination service (newly added in Rel-17) | Data collection coordination service (Nnwdaf_DataCollectionCoordination) of the NWDAF |
| Data collection service (newly added in Rel-17) | Event capability exposure service (Nnwdaf_EventExposure) of the NWDAF, that is, data exposure service of the NWDAF | a data analytics network element (NWDAF ID), an internet protocol address (IP address), a fully qualified domain name (FQDN), and a uniform resource locator (URL), of a target NWDAF that meets the preset condition of the first network element.

Step 3: The NRF triggers a network element discovery request response (Nnrf_NFDiscovery_Request Response) service operation over the Nnrf interface, and sends reply information to the first network element, where the reply In the Rel-17 phase, the functions of the NWDAF network element are divided into a data collection function, a model training function, an inference function, a data repository function, a data collection coordination function, and the like.

It should be understood that each type of service in the foregoing services may correspond to one or more functions. Table 6 shows a possible correspondence between a service and a function as follows:

TABLE 6

| Service name | Function name (corresponding to one or more functions) |
| --- | --- |
| Analytics result subscription service (Nnwdaf_AnalyticsSubscription) of the NWDAF network element or analytics result information service (Nnwdaf_AnalyticsInfo) of the NWDAF network element | Inference data collection function Analytics result inference function Analytics result exposure function |
| Machine learning model exposure service (Nnwdaf_MLModelProvision) of the NWDAF network element (Provision may alternatively be replaced with Subscription, subscription) or machine learning model information service (Nnwdaf_MLModelINfoNWDAF) of the network element | Training data collection Model exposure function Training function |
| Data repository service (Nnwdaf_DataRepository) of the NWDAF network element | Data collection function (training data or inference data) Data repository function Data exposure function |
| Data collection coordination service (Nnwdaf_DataCollectionCoordination) of the NWDAF | Data collection coordination function (training data or inference data) |
| Event capability exposure service (Nnwdaf_EventExposure) of the NWDAF, that is, data exposure service of the NWDAF | Data collection function (training data or inference data) |

It should be noted that, a plurality of NWDAFs registered in the NRF may support different services or functions for a same Analytics ID. Specifically, different NWDAFs may support some or all of the above five services for the same Analytics ID. Correspondingly, the different NWDAFs may also support one or more of the foregoing data collection function, model training function, inference function, data repository function, data collection coordination function, analytics result exposure function, model exposure function, training data or inference data exposure function, and the like.

In the Rel-16 phase, the NWDAF registered in the NRF supports only the analytics result exposure service (Nnwdaf_AnalyticsSubscription or Nnwdaf_AnalyticsInfo) for a specific analytics identifier Analytics ID. That is, regardless of which analytics identifier Analytics ID is carried in the request information sent by the first network element to the NRF, the service name carried in the request information includes only the analytics result exposure service. Therefore, the NWDAF that is determined by the NRF based on the analytics identifier Analytics ID in the request information and whose registered information includes the analytics identifier Analytics ID can provide only the analytics result exposure service, which is consistent with a service actually required to be provided in the request information of the first network element. That is, the NWDAF determined by the NRF based on the request information completely matches the NWDAF actually required by the first network element.

It should be noted that, the analytics identifier and the service name in the network element information of the NWDAF registered in the NRF are at a same level. It may be understood that the analytics identifier and the service name have a same priority, there is no binding relationship or mapping relationship between the analytics identifier and the service name, and the analytics identifier and the service name exist independently of each other.

However, in the Rel-17 phase, different NWDAFs in the registered information in the NRF may support different services for a same analytics identifier Analytics ID. Specifically, the different NWDAFs may support one or more services of the analytics result exposure service, the model exposure service, the data repository service, the data collection service, and the data collection coordination service for the same analytics identifier. In addition, registered information of a same NWDAF may also include one or more analytics identifiers Analytics IDs, and services that are supported by the NWDAF and that correspond to different analytics identifiers Analytics IDs in the NWDAF may also be different.

This causes a problem. If the NRF still determines, based on only the analytics identifier and the required service name that are carried in the request information sent by the first network element, the NWDAF that meets the preset condition of the first network element, that is, the NWDAF meets the preset condition of the first network element provided that the registered information of the NWDAF includes the analytics identifier and the service name that are required in the request information, and if the registered information of the NWDAF includes a plurality of analytics identifiers Analytics IDs, and different analytics identifiers correspond to different services, in this case, when the analytics identifier and the service name that are required by the first network element do not correspond to each other in the NWDAF, the NWDAF cannot meet both the analytics identifier required by the first network element and the service that the first network element requires to provide. That is, the NWDAF determined by the NRF does not match the NWDAF actually required by the first network element. After receiving the address information of the NWDAF determined by the NRF, the first network element cannot use the address information, which causes a waste of resources and cannot ensure a service of the first network element.

For example, in the registered information in the NRF, an NWDAF #1 supports only the model exposure service for Analytics ID #M, but does not support the analytics result exposure service and the data repository service, and does not support the model exposure service for Analytics ID #N, but supports the analytics result exposure service and the data repository service. It is assumed that the first network element searches the NRF for an NWDAF that supports the Analytics ID #M and the analytics result exposure service. In this case, the request information sent by the first network element to the NRF may include the Analytics ID #M and the service name of the analytics result exposure service. The NWDAF determined by the NRF based on the request information is the NWDAF #1. It is clear that, the NWDAF #1 cannot meet an actual requirement of the first network element. This is because registered information of the NWDAF #1 in the NRF includes: service names, that is, the analytics result exposure service, the model exposure service, and the data repository service, supported by the NWDAF #1; and analytics identifiers, that is, the Analytics ID #M and the Analytics ID #N, supported by the NWDAF #1. Provided that registered information of an NWDAF includes an analytics identifier and a service name that are required in the request information of the first network element, the NWDAF is determined by the NRF as the NWDAF that meets the preset condition of the first network element, and the NRF feeds back an address of the NWDAF #1 to the first network element. However, the NWDAF #1 actually does not meet the preset condition of the first network element.

For the foregoing problem, this application provides a communication method, so that the NWDAF determined by the NRF based on the request information of the first network element can completely match the NWDAF actually required by the first network element, thereby avoiding a waste of resources and ensuring a service of the first network element.

Figure 4:
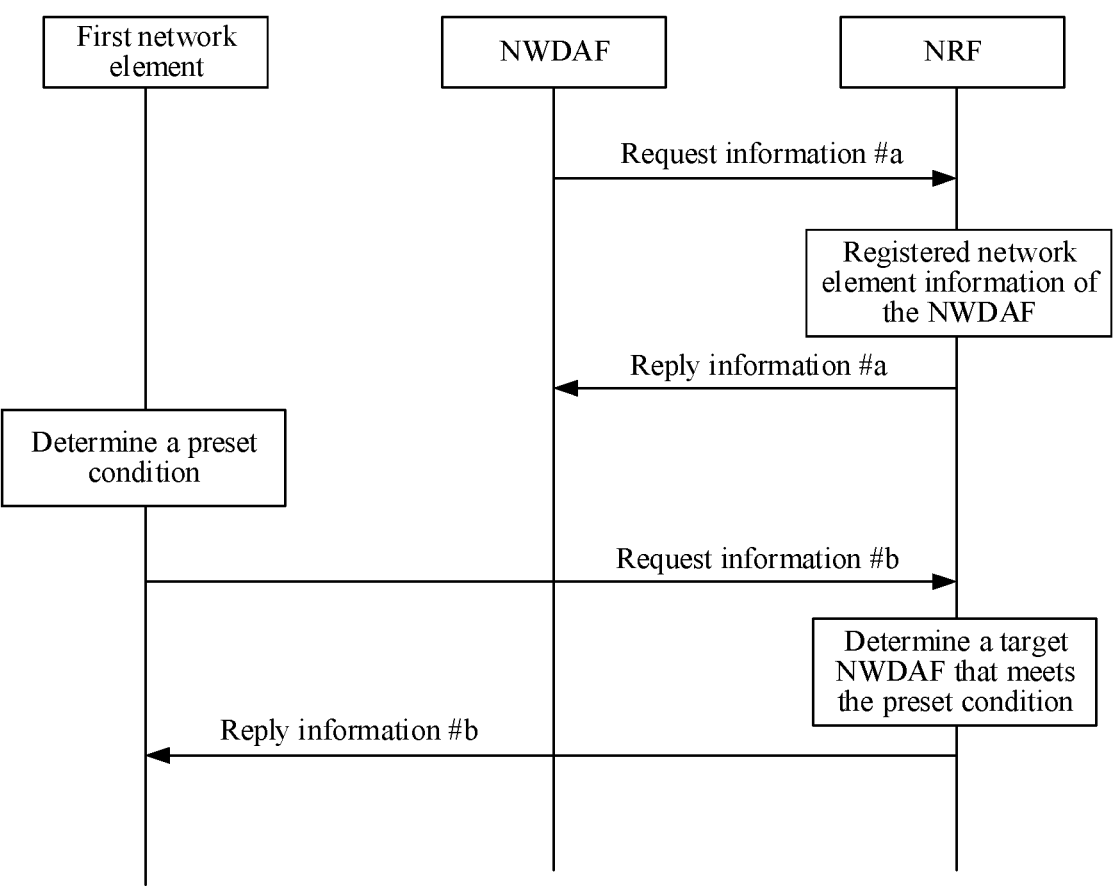
FIG. 4 is a schematic flowchart of an embodiment of a communication method according to this application.

The following describes a communication method 100 in this application with reference to FIG. 4.

S101: An NWDAF sends request information #a to an NRF, where the request information #a is used to request to register with the NRF, and the request information #a includes a correspondence between an analytics identifier and a service.

In a possible implementation, the request information #a includes the correspondence between the analytics identifier and information about the service. The analytics identifier indicates an analytics type (for example, slice load analytics, service experience analytics, network element load analytics, network performance analytics, terminal mobility analytics, terminal communication analytics, terminal abnormal behavior analytics, user data congestion analytics, and quality of service parameter sustainability analytics) supported by the NWDAF. The information about the service indicates a service (for example, a model request service, a model subscription service, a data repository request service, or a data collection coordination service) supported by the NWDAF. Specifically, the information about the service includes a name of the service.

It should be noted that, in addition to including the correspondence between the analytics identifier and the service, the request information #a further includes another network element information of the NWDAF, for example, one or more of the following information corresponding to the NWDAF: a network element type, address information, and a service area. This is similar to that in the conventional technology herein, and details are not described herein again.

S102: The NRF receives the request information #a, and stores network element information registered by the NWDAF, where the network element information includes the correspondence between the analytics identifier and the service.

S103: The NRF sends a reply message #a to the NWDAF, to notify the NWDAF that the registration succeeds.

S104: A first network element determines a preset condition (which may be understood as a data analytics requirement of the first network element for a to-be-requested NWDAF) for the NWDAF, where the preset condition includes information about a service that needs to be supported by the NWDAF and an analytics identifier corresponding to the information about the service.

S105: The first network element sends request information #b to the NRF, where the request information #b is used to request information about an NWDAF network element that meets the preset condition of the first network element, and the request information #b includes the preset condition of the first network element.

S106: The NRF receives the request information #b, and determines, based on the request information #b, an NWDAF that meets the preset condition of the first network element.

S107: The NRF sends a reply message #b to the first network element, where the reply message #b includes information about the NWDAF that meets the preset condition of the first network element.

In a possible implementation, the information about the NWDAF that meets the preset condition of the first network element includes address information of the NWDAF, for example, one or more of an IP address, an identifier of the NWDAF, an FQDN, and a URL. The following uses the address information of the NWDAF as an example for description.

In a possible implementation, the correspondence between the analytics identifier and the service may be specifically reflected as the correspondence between the analytics identifier and the information about the service. The analytics identifier may indicate an analytics type (for example, slice load analytics, service experience analytics, network element load analytics, network performance analytics, terminal mobility analytics, terminal communication analytics, terminal abnormal behavior analytics, user data congestion analytics, and quality of service parameter sustainability analytics). The information about the service includes a name of the service. An example in which the information about the service is the name of the service is used below for description.

It should be noted that, each service supported by the NWDAF may correspond to one or more functions, and each function has a corresponding service. Therefore, in another possible implementation, in the communication method 100, the correspondence between the analytics identifier and the service may alternatively be replaced with a correspondence between the analytics identifier and the function. The correspondence between the analytics identifier and the service may be further determined through a correspondence between the function and the service. Similarly, in the communication method 100, the correspondence between the analytics identifier and the service may alternatively be replaced with a correspondence between the analytics identifier and another parameter, where there is a correspondence between the another parameter and the service, or there may be a similar replacement relationship for the analytics identifier. It should be understood that regardless of whether the correspondence between the analytics identifier and the service is directly determined or the correspondence between the analytics identifier and the service is indirectly determined, a replacement manner in which the correspondence between the analytics identifier and the service can be substantially determined falls within the protection scope of this application. The correspondence between the analytics identifier and the service is used as an example for description, and should not constitute a limitation on this application.

It should be further noted that, the NRF determines, based on the request information #b, that there are one or more NWDAFs that meet the preset condition of the first network element. Correspondingly, the reply message #b sent by the NRF may also include one or more pieces of address information of the NWDAFs that meet the preset condition of the first network element. This is not limited in this application.

It should be further noted that, if the reply information #b sent by the NRF includes address information of a plurality of NWDAFs that meet the preset condition of the first network element, the first network element may select any one of the NWDAFs as a target NWDAF.

Figure 5:
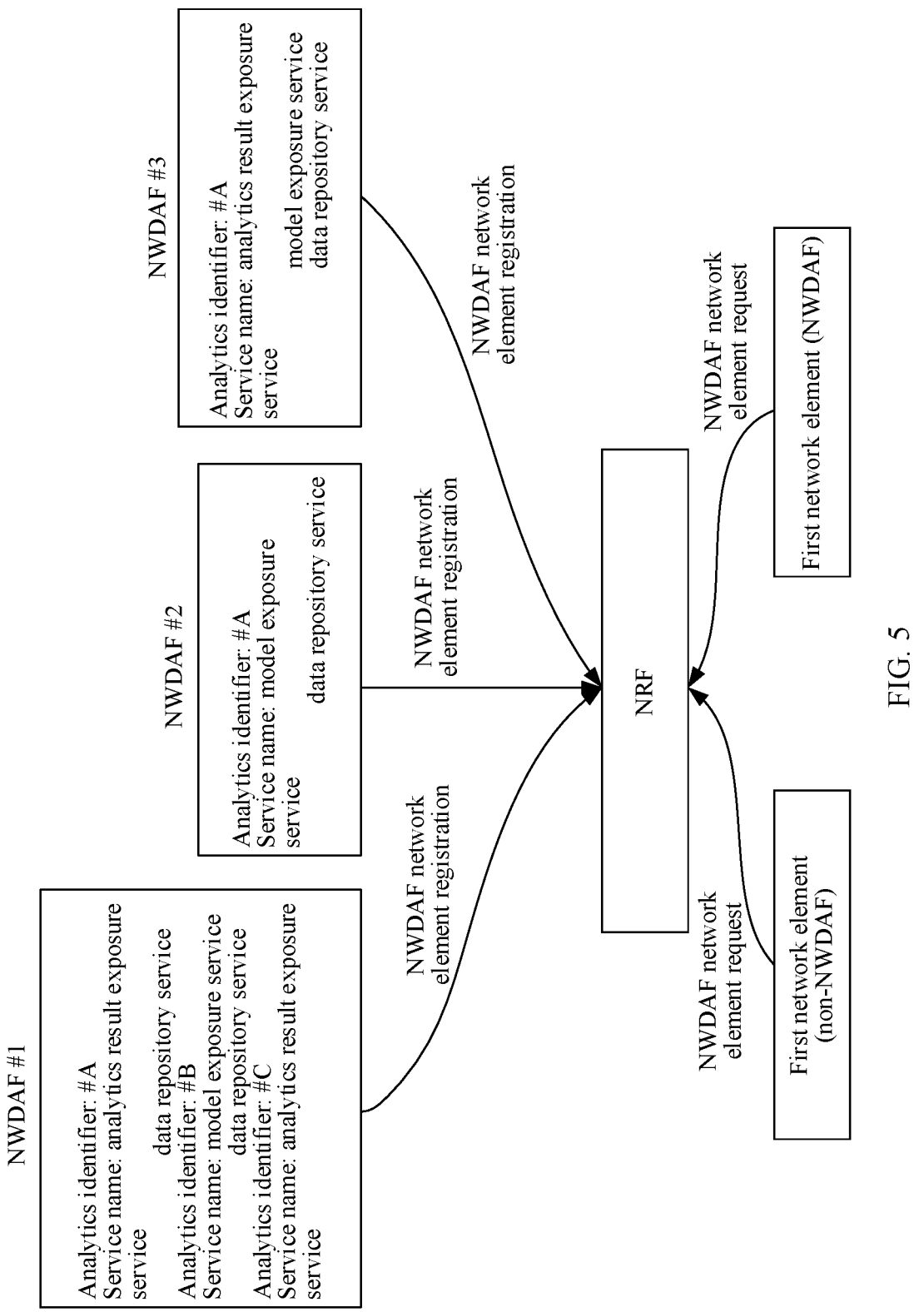
FIG. 5 is a schematic diagram of another embodiment of a communication method according to this application.

The following further describes a possible implementation of the communication method 100 in this application with reference to a specific registration parameter in FIG. 5 by using an example in which the network element information registered by the NWDAF with the NRF includes the correspondence between the analytics identifier and the service.

In FIG. 5, for example, NWDAFs registered in the NRF include an NWDAF #1, an NWDAF #2, and an NWDAF #3. In registered information of the NWDAF #1, the NWDAF #1 can provide an analytics result exposure service and a data repository service for an analytics identifier #A, the NWDAF #1 can provide a model exposure service and a data repository service for an analytics identifier #B, and the NWDAF #1 can provide an analytics result exposure service for an analytics identifier #C. In registered information of the NWDAF #2, the NWDAF #2 can provide a model exposure service and a data repository service for an analytics identifier #A. In registered information of the NWDAF #3, the NWDAF #3 can provide an analytics result exposure service, a model exposure service, and a data repository service for an analytics identifier #A.

Possible Implementation #A

In the possible implementation #A, the correspondence between the analytics identifier and the service in the network element information registered by the NWDAF with the NRF is placed hierarchically, that is, the analytics identifier and the service are placed at a same level or at different levels. By way of example but not limitation, the levels may be divided into a first level, a second level, and the like. In step S106, when determining, based on the request information #b, the NWDAF that meets the preset condition of the first network element, the NRF preferentially searches network element information at the first level. When the NRF can determine, based on the network element information at the first level, the NWDAF that meets the preset condition, the NRF stops searching and feeds back address information of the NWDAF that meets the preset condition to the first network element. Otherwise, the NRF continues to search network element information at a next level (the second level) until the NWDAF that meets the preset condition is determined.

Similarly, different priorities may be further set for the analytics identifier and the service. In step S106, when determining, based on the request information #b, the NWDAF that meets the preset condition of the first network element, the NRF first searches network element information with a high priority. When the NRF can determine, based on the network element information of the priority, the NWDAF that meets the preset condition, the NRF stops searching and feeds back address information of the NWDAF that meets the preset condition to the first network element. Otherwise, the NRF continues to search network element information with a next priority until the NWDAF that meets the preset condition is determined.

It should be understood that hierarchically placing the analytics identifier and the service or setting the priorities for the analytics identifier and the service is merely used as a specific example. In the possible implementation #A, a sequence in which the NRF searches the registered network element information is actually defined. A specific implementation is not limited in this application. Any manner in which the sequence in which the NRF can search the registered network element information can be defined falls within the protection scope of this application.

The following further describes several possible implementations corresponding to the possible implementation #A by using an example in which the analytics identifier and the service are placed hierarchically.

Possible Implementation #A1

In the possible implementation #A1, the communication method 100 can be applied to the Rel-17 phase and a new phase that may appear later, and can also be compatible with the Rel-16 phase.

It should be first noted that, when the first network element requests, from the NRF, the NWDAF that meets the preset condition of the first network element, there is a correspondence between a network element type (NF type) of the first network element and a service name in the request information sent by the first network element to the NRF. For an analytics result exposure (Nnwdaf_Analytics-Subscription or Nnwdaf_AnalyticsInfo) service, the network element type of the first network element may be an NWDAF network element or a non-NWDAF network element. For a non-analytics result exposure (Nnwdaf_Analytics) service, that is, for a model exposure service, a data repository service, a data collection coordination service, or a data collection service, the network element type of the first network element includes only the NWDAF network element.

In the possible implementation #A1, for the non-analytics result exposure service (that is, the model exposure service, the data repository service, the data collection coordination service, or the data collection service), the non-analytics result exposure service is placed at the first level of the network element information registered by the NWDAF, and then an analytics identifier, as a parameter corresponding to the service, is placed at the second level of the network element information registered by the NWDAF. Alternatively, an analytics identifier is placed at the first level of the network element information registered by the NWDAF, and then the non-analytics result exposure service, as a parameter corresponding to the analytics identifier, is placed at the second level of the network element information registered by the NWDAF.

In the possible implementation #A1, for the analytics result exposure service, refer to a placement manner of the analytics identifier and the service in the Rel-16 phase, and both the analytics result exposure service and the analytics identifier corresponding to the service are placed at the first level of the network element information registered by the NWDAF.

With reference to FIG. 5, Table 7 shows an example of the network element information registered by the NWDAF in the possible implementation #A1.

TABLE 7

| Type of a first network element | First level | Second level |
|---|---|---|
| | NWDAF #1 | |
| Non-NWDAF network element or NWDAF network element | Analytics identifier #A and analytics identifier #C | Others |
| Non-NWDAF network element or NWDAF network element | Analytics result exposure service | Others |
| NWDAF network element | Model exposure service | Analytics identifier #B |
| NWDAF network element | Data repository service | Analytics identifier #A and analytics identifier #B |
| | NWDAF #2 | |
| NWDAF network element | Model exposure service | Analytics identifier #A |
| NWDAF network element | Data repository service | Analytics identifier #A |
| | NWDAF #3 | |
| Non-NWDAF network element or NWDAF network element | Analytics identifier #A | Others |
| Non-NWDAF network element or NWDAF network element | Analytics result exposure service | Others |
| NWDAF network element | Model exposure service | Analytics identifier #A |
| NWDAF network element | Data repository service | Analytics identifier #A |

Corresponding to the possible implementation #A1, a communication method 200 is provided. The communication method 200 includes the following steps.

S201: An NWDAF sends request information #a to an NRF, where the request information #a is used to request to register with the NRF, and the request information #a includes a correspondence between an analytics identifier and a service and also includes network element type information of a first network element.

In a possible implementation, the NWDAF triggers a network element registration request (Nnrf_NFManagement_NFRegister_request) service operation in network element management over an Nnrf interface, and sends the request information #a to the NRF, where the request information #a is used to request to register with the NRF, and the request information #a includes the correspondence between the analytics identifier and the service, and a correspondence between a type of the first network element and the service.

It should be noted that, in addition to including the correspondence between the analytics identifier and the service, the request information #a further includes another network element information of the NWDAF, for example, one or more of the following information corresponding to the NWDAF: a network element type, address information, and a service area. This is similar to that in the conventional technology herein, and details are not described herein again.

Table 8 shows a possible correspondence between the type of the first network element and the service.

TABLE 8

| Type of a first network element | Service name |
|---|---|
| Non-NWDAF network element or NWDAF network element | Analytics result exposure service |
| NWDAF network element | Model exposure service |
| | Data repository service |
| | Data collection coordination service |
| | Data collection service |

S202: The NRF receives the request information #a, and stores network element information registered by the NWDAF, where the information includes the correspondence between the analytics identifier and the service (for example, Table 7) and the correspondence between the type of the first network element and the service (for example, Table 8).

S203: The NRF sends reply information #a to the NWDAF, to notify the NWDAF that the registration succeeds.

In a possible implementation, the NRF triggers a network element registration response (Nnrf_NFManagement_NFRegister_response) service operation in the network element management over the Nnrf interface, and sends the reply information #a to the NWDAF, to notify the NWDAF that the registration succeeds.

S204: The first network element determines a preset condition for the NWDAF, where the preset condition includes a service name and an analytics identifier corresponding to the service name that need to be supported by the NWDAF.

By way of example but not limitation, when the first network element is a PCF, if the PCF needs to obtain a service experience data analytics result from the NWDAF to adjust a QoS parameter of the service, the PCF first determines that the NWDAF that meets the preset condition needs to support the analytics result exposure service, that is, the service name supported by the NWDAF that meets the preset condition needs to include a service name of the analytics result exposure service, and then determines that an analytics identifier Analytics ID corresponding to the analytics result exposure service in the NWDAF that meets the preset condition is service experience Service Experience.

S205: The first network element sends request information #b to the NRF, where the request information #b is used to request address information of an NWDAF network element that meets the preset condition of the first network element. The request information #b includes a network element type of the first network element. If the type of the first network element is the NWDAF network element, the request information #b further includes a service name and an analytics identifier corresponding to the service name that the first network element requires the NWDAF to support.

In a possible implementation, the NWDAF triggers a network element discovery request (Nnrf_NFDiscovery_Request) service operation over the Nnrf interface to the NRF, and sends the request information #b to the NRF, where the request information #b is used to request address information of an NWDAF network element that meets the preset condition of the first network element. The request information #b includes the network element type of the first network element. If the type of the first network element is the NWDAF network element, the request information #b further includes the service name and the analytics identifier corresponding to the service name that the first network element requires the NWDAF to support.

S206: The NRF receives the request information #b, and determines, based on the request information #b, an NWDAF that meets the preset condition of the first network element.

In a possible implementation, the NRF receives the request information #b, and determines the type of the first network element in the request information #b. If the type of the first network element is the non-NWDAF network element or the NWDAF network element, the NRF searches the first-level network element information registered by the NWDAF and determines whether an analytics identifier that meets the preset condition exists. If the type of the first network element is the NWDAF, the NRF first searches the first-level network element information registered by the NWDAF and determines whether a service name (or an analytics identifier) that meets the preset condition exists, and if the service name (or the analytics identifier) exists, further searches the second-level network element information registered by the NWDAF, and determines whether the analytics identifier (or the service name) that meets the preset condition exists.

S207: The NRF sends reply information #b to the first network element, where the reply information #b includes address information of the NWDAF that meets the preset condition of the first network element.

In a possible implementation, the NRF triggers a network element discovery request response (Nnrf_NFDiscovery_Request Response) service operation over the Nnrf interface, and sends the reply information #b to the first network element, where the reply information #b includes the address information of the NWDAF that meets the preset condition of the first network element.

It should be noted that, the NRF determines, based on the request information #b, that there are one or more NWDAFs that meet the preset condition of the first network element. Correspondingly, the reply information #b sent by the NRF may also include one or more pieces of address information of the NWDAFs that meet the preset condition of the first network element. This is not limited in this application.

It should be further noted that, if the reply information #b sent by the NRF includes address information of a plurality of NWDAFs that meet the preset condition of the first network element, the first network element may select any one of the NWDAFs as a target NWDAF.

In a possible implementation, in the communication method 200, the request information #a and the request information #b may alternatively include the service name and the analytics identifier corresponding to the service name that the first network element requires the NWDAF to support, but do not include the type of the first network element. After receiving the request information #b, the NRF no longer determines the type of the first network element, but determines, based on the analytics identifier and the service name that correspond to each other in the request information #b, the NWDAF that meets the preset condition of the first network element.

It should be noted that, if the preset condition in the request information #b sent by the first network element to the NRF includes a plurality of analytics identifiers and/or a plurality of service names, the request information #b in the communication method 200 further includes a correspondence between the analytics identifiers and the service names. A specific correspondence manner is not limited in this application.

In the foregoing possible implementation #A1, the NRF can assist the first network element in finding the NWDAF that meets the preset condition of the first network element, that is, the NWDAF determined by the NRF by using the preset condition of the first network element can completely match the NWDAF actually required by the first network element. That is, the service of the first network element is ensured, and the waste of resources is avoided.

The following further describes a second possible implementation corresponding to the possible implementation #A by still using an example in which the analytics identifier and the service are placed hierarchically.

Possible Implementation #A2

In the possible implementation #A2, the communication method 100 can be applied to the Rel-17 phase and a new phase that may appear later, but is incompatible with the Rel-16 phase.

In the possible implementation #A2, an analytics identifier is placed at the first level of the network element information registered by the NWDAF, and then a service, as a parameter corresponding to the analytics identifier, is placed at the second level of the network element information registered by the NWDAF.

With reference to FIG. 5, Table 9 shows an example of the network element information registered by the NWDAF in the possible implementation #A2.

TABLE 9

| First level | Second level |
|---|---|
| | NWDAF #1 |
| Analytics identifier #A | Analytics result exposure service |
| | Data repository service |
| Analytics identifier #B | Model exposure service |
| | Data repository service |
| Analytics identifier #C | Analytics result exposure service |
| | NWDAF #2 |
| Analytics identifier #A | Model exposure service |
| | Data repository service |
| | NWDAF #3 |
| Analytics identifier #A | Analytics result exposure service |
| | Model exposure service |
| | Data repository service |

Corresponding to the possible implementation #A2, the communication method 100 specifically includes the following steps.

S101: An NWDAF sends request information #a to an NRF, where the request information #a is used to request to register with the NRF, and the request information #a includes a correspondence between an analytics identifier and a service.

In a possible implementation, the NWDAF triggers a network element registration request (Nnrf_NFManagement_NFRegister_request) service operation in network element management over an Nnrf interface, and sends the request information #a to the NRF, where the request information #a is used to request to register with the NRF, and the request information #a includes the correspondence between the analytics identifier and the service.

In a possible implementation, the correspondence between the analytics identifier and the service in the request information #a includes: one or more analytics identifiers Analytics IDs, and a name of one or more service operations supported by each analytics identifier. That is, the service is used as a parameter of the analytics identifier.

By way of example but not limitation, the NWDAF first locally collects and stores service experience data from an AF and corresponding network data from a 5GC NF, trains a service experience model based on the service experience data and the corresponding network data, and deploys the model locally. Correspondingly, the NWDAF may support the analytics result exposure service, the model exposure service, and the data repository service for an analytics identifier Analytics ID of service experience Service Experience.

Therefore, specific content of the correspondence between the analytics identifier and the service in the request information #a sent by the NWDAF is as follows: the analytics identifier Analytics ID=Service Experience and the foregoing three services corresponding to the analytics identifier. The NWDAF may register the foregoing three services with the NRF as parameters of the analytics identifier Analytics ID=Service Experience.

It should be noted that, in addition to including the correspondence between the analytics identifier and the service, the request information #a further includes another network element information of the NWDAF, for example, one or more of the following information corresponding to the NWDAF: a network element type, address information, and a service area. This is similar to that in the conventional technology herein, and details are not described herein again.

S102: The NRF receives the request information #a, and stores network element information registered by the NWDAF, where the network element information includes the correspondence between the analytics identifier and the service (for example, Table 9).

S103: The NRF sends reply information #a to the NWDAF, to notify the NWDAF that the registration succeeds.

In a possible implementation, the NRF triggers a network element registration response (Nnrf_NFManagement_N-FRegister_response) service operation in the network element management over the Nnrf interface, and sends the reply information #a to the NWDAF, to notify the NWDAF that the registration succeeds.

S104: A first network element determines a preset condition for the NWDAF, where the preset condition includes an analytics identifier and a service name corresponding to the analytics identifier that need to be supported by the NWDAF.

By way of example but not limitation, when the first network element is a PCF, if the PCF needs to obtain a service experience data analytics result from the NWDAF to adjust a QoS parameter of the service, the PCF first determines that the NWDAF that meets the preset condition needs to support service experience analytics, that is, an analytics identifier supported by the NWDAF that meets the preset condition needs to include an analytics identifier of service experience Service Experience, and then determines that a service name corresponding to the analytics identifier in the NWDAF that meets the preset condition needs to include a service name of the analytics result exposure service.

S105: The first network element sends request information #b to the NRF, where the request information #b is used to request address information of an NWDAF network element that meets the preset condition of the first network element, and the request information #b includes the preset condition of the first network element, that is, an analytics identifier and a service name corresponding to the analytics identifier that the first network element requires the NWDAF to support.

In a possible implementation, the NWDAF triggers a network element discovery request (Nnrf_NFDiscovery_Request) service operation over the Nnrf interface to the NRF, and sends the request information #b to the NRF, where the request information #b is used to request the address information of the NWDAF network element that meets the preset condition of the first network element, and the request information #b includes the analytics identifier and the service name corresponding to the analytics identifier that the first network element requires the NWDAF to support.

S106: The NRF receives the request information #b, and determines, based on the request information #b, an NWDAF that meets the preset condition of the first network element.

In a possible implementation, after receiving the request information #b, the NRF first searches, based on the analytics identifier carried in the request information #b, first-level network element information locally registered by the NWDAF with the NRF and determines one or more NWDAFs that support the analytics identifier, determines the one or more NWDAFs as a first NWDAF list that supports the analytics identifier, then searches, based on the service name that corresponds to the analytics identifier and that is carried in the request information #b, second-level network element information registered by the NWDAF in the first NWDAF list and determines one or more NWDAFs that support the service, and determines the one or more NWDAFs as a second NWDAF list that supports both the analytics identifier and the service corresponding to the analytics identifier.

By way of example but not limitation, the NRF first searches, based on an analytics identifier of service experience carried in the request information #b, the first-level network element information locally registered by the NWDAF with the NRF and determines one or more NWDAFs that support the analytics identifier of the service experience, determines the one or more NWDAFs as a first NWDAF list that supports the analytics identifier, where all NWDAFs in the first NWDAF list support the analytics ID of the service experience, then searches, based on an analytics result exposure service corresponding to the analytics identifier of the service experience in the request information #b, the second-level network element information registered by the NWDAF in the first NWDAF list and determines one or more NWDAFs that support the analytics result exposure service, and determines the one or more NWDAFs as a second NWDAF list that supports both the analytics identifier of the service experience and the analytics result exposure service corresponding to the analytics identifier.

S207: The NRF sends reply information #b to the first network element, where the reply information #b includes address information of the NWDAF that meets the preset condition of the first network element.

In a possible implementation, the NRF triggers a network element discovery request response (Nnrf_NFDiscovery_Request Response) service operation over the Nnrf interface, and sends the reply information #b to the first network element, where the reply information #b includes address information of each NWDAF in the second NWDAF list, for example, an identifier of the NWDAF (NWDAF ID), an internet protocol address (IP address), a fully qualified domain name (FQDN), and a uniform resource locator (URL).

It should be noted that, the NRF determines, based on the request information #b, that there may be one or more NWDAFs that meet the preset condition of the first network element, that is, the second NWDAF list may include one or more NWDAFs that meet the preset condition. Correspondingly, the reply information #b sent by the NRF may also include one or more pieces of address information of the NWDAFs that meet the preset condition of the first network element. This is not limited in this application.

It should be further noted that, if the reply information #b sent by the NRF includes address information of a plurality of NWDAFs that meet the preset condition of the first network element, the first network element may select any one of the NWDAFs as a target NWDAF.

It should be noted that, if the preset condition in the request information #b sent by the first network element to the NRF includes a plurality of analytics identifiers and/or a plurality of service names, the request information #b in the communication method 200 further includes a correspondence between the analytics identifiers and the service names. A specific correspondence manner is not limited in this application.

In the foregoing possible implementation #A2, the NRF stores the analytics identifier and the service name corresponding to the analytics identifier that are supported by the NWDAF, that is, the NRF stores the correspondence between the analytics identifier supported by the NWDAF and the service name supported by the NWDAF. Therefore, the NRF can assist, based on the analytics identifier and information about the service name corresponding to the analytics identifier in the preset condition of the first network element, the first network element in finding the NWDAF that meets the preset condition of the first network element, that is, the NWDAF determined by the NRF by using the preset condition of the first network element can completely match the NWDAF actually required by the first network element. That is, the service of the first network element is ensured, and the waste of resources is avoided.

The following further describes a third possible implementation corresponding to the possible implementation #A by still using an example in which the analytics identifier and the service are placed hierarchically.

Possible Implementation #A3

In the possible implementation #A3, the communication method 100 can be applied to the Rel-17 phase and a new phase that may appear later, but is incompatible with the Rel-16 phase.

In the possible implementation #A3, a service name is placed at the first level of the network element information registered by the NWDAF, and then an analytics identifier, as a parameter corresponding to the service name, is placed at the second level of the network element information registered by the NWDAF.

With reference to FIG. 5, Table 10 shows an example of the network element information registered by the NWDAF in the possible implementation #A3.

TABLE 10

| First level | Second level |
| --- | --- |
| NWDAF #1 | |
| Analytics result exposure service | Analytics identifier #A |
| | Analytics identifier #C |
| Data repository service | Analytics identifier #A |
| | Analytics identifier #B |
| Model exposure service | Analytics identifier #B |
| NWDAF #2 | |
| Model exposure service | Analytics identifier #A |
| Data repository service | Analytics identifier #A |
| NWDAF #3 | |
| Analytics result exposure service | Analytics identifier #A |
| Model exposure service | Analytics identifier #A |
| Data repository service | Analytics identifier #A |

Corresponding to the possible implementation #A3, the communication method 100 specifically includes the following steps.

S101: An NWDAF sends request information #a to an NRF, where the request information #a is used to request to register with the NRF, and the request information #a includes a correspondence between a service name and an analytics identifier.

In a possible implementation, the NWDAF triggers a network element registration request (Nnrf_NFManagement_NFRegister_request) service operation in network element management over an Nnrf interface, and sends the request information #a to the NRF, where the request information #a is used to request to register with the NRF, and the request information #a includes the correspondence between the service name and the analytics identifier.

In a possible implementation, the correspondence between the service name and the analytics identifier in the request information #a includes: one or more service names, and one or more analytics identifiers supported by a service operation corresponding to each service name. That is, the analytics identifier is a parameter corresponding to the service name.

By way of example but not limitation, the NWDAF first locally collects and stores service experience data from an AF and corresponding network data from a 5GC NF, trains a service experience model based on the service experience data and the corresponding network data, and deploys the model locally. Correspondingly, the NWDAF may support the analytics result exposure service, the model exposure service, and the data repository service. Specific content of the correspondence between the service name and the analytics identifier in the request information #a sent by the NWDAF is as follows: the foregoing three service names and analytics identifiers of service experience Service Experience corresponding to the foregoing three service names. The NWDAF may register the foregoing three service names and the analytics identifier of the Service Experience corresponding to each service name as a parameter corresponding to the service names with the NRF.

It should be noted that, in addition to including the correspondence between the analytics identifier and the service, the request information #a further includes another network element information of the NWDAF, for example, one or more of the following information corresponding to the NWDAF: a network element type, address information, and a service area. This is similar to that in the conventional technology herein, and details are not described herein again.

S102: The NRF receives the request information #a, and stores network element information registered by the NWDAF, where the network element information includes the correspondence between the analytics identifier and the service (for example, Table 10).

S103: The NRF sends reply information #a to the NWDAF, to notify the NWDAF that the registration succeeds.

In a possible implementation, the NRF triggers a network element registration response (Nnrf_NFManagement_N-FRegister_response) service operation in the network element management over the Nnrf interface, and sends the reply information #a to the NWDAF, to notify the NWDAF that the registration succeeds.

S104: A first network element determines a preset condition for the NWDAF, where the preset condition includes a service name and an analytics identifier corresponding to the service name that need to be supported by the NWDAF.

By way of example but not limitation, when the first network element is a PCF, if the PCF needs to obtain a service experience data analytics result from the NWDAF to adjust a QoS parameter of the service, the PCF first determines that the NWDAF that meets the preset condition needs to support the analytics result exposure service, that is, Service Name=Nnwdaf_AnalyticsSubscription or Nnwdaf_AnalyticsInfo, and then determines that an analytics identifier corresponding to the analytics identifier in the NWDAF that meets the preset condition needs to include an analytics identifier of service experience, that is, Analytics ID=Service Experience.

S105: The first network element sends request information #b to the NRF, where the request information #b is used to request address information of an NWDAF network element that meets the preset condition of the first network element, and the request information #b includes the preset condition of the first network element, that is, a service name and an analytics identifier corresponding to the service name that the first network element requires the NWDAF to support.

In a possible implementation, the NWDAF triggers a network element discovery request (Nnrf_NFDiscovery-_Request) service operation over the Nnrf interface to the NRF, and sends the request information #b to the NRF, where the request information #b is used to request the address information of the NWDAF network element that meets the preset condition of the first network element, and the request information #b includes the service name and the analytics identifier corresponding to the service name that the first network element requires the NWDAF to support.

S106: The NRF receives the request information #b, and determines, based on the request information #b, an NWDAF that meets the preset condition of the first network element.

In a possible implementation, after receiving the request information #b, the NRF first searches, based on the service name carried in the request information #b, first-level network element information locally registered by the NWDAF with the NRF and determines one or more NWDAFs that support the service name, determines the one or more NWDAFs as a first NWDAF list that supports the service name, then searches, based on the analytics identifier that corresponds to the service name and that is carried in the request information #b, second-level network element information registered by the NWDAF in the first NWDAF list and determines one or more NWDAFs that support the analytics identifier, and determines the one or more NWDAFs as a second NWDAF list that supports both the service name and the analytics identifier corresponding to the service name.

By way of example but not limitation, the NRF first searches, based on the service name of the analytics result exposure service carried in the request information #b (that is, Service Name=Nnwdaf_AnalyticsSubscription or Nnwdaf_AnalyticsInfo), the first-level network element information locally registered by the NWDAF with the NRF and determines one or more NWDAFs that support the analytics result exposure service, determines the one or more NWDAFs a first NWDAF list that supports the analytics result exposure service, then further searches, based on the analytics identifier of the service experience (that is, Analytics ID=Service Experience) corresponding to the service name of the analytics result exposure service in the request information #b, the second-level network element information registered by the NWDAF in the first NWDAF list and determines one or more NWDAFs that support the analytics identifier of the service experience, and determines the one or more NWDAFs as a second NWDAF list that supports both the analytics result exposure service and the analytics identifier of the service experience corresponding to the analytics result exposure service.

S207: The NRF sends reply information #b to the first network element, where the reply information #b includes address information of the NWDAF that meets the preset condition of the first network element.

In a possible implementation, the NRF triggers a network element discovery request response (Nnrf_NFDiscovery-_Request Response) service operation over the Nnrf interface, and sends the reply information #b to the first network element, where the reply information #b includes address information of each NWDAF in the second NWDAF list, for example, an identifier of the NWDAF (NWDAF ID), an internet protocol address (IP address), a fully qualified domain name (FQDN), and a uniform resource locator (URL).

It should be noted that, the NRF determines, based on the request information #b, that there may be one or more NWDAFs that meet the preset condition of the first network element, that is, the second NWDAF list may include one or more NWDAFs that meet the preset condition. Correspondingly, the reply information #b sent by the NRF may also include one or more pieces of address information of the NWDAFs that meet the preset condition of the first network element. This is not limited in this application.

It should be further noted that, if the reply information #b sent by the NRF includes address information of a plurality of NWDAFs that meet the preset condition of the first network element, the first network element may select any one of the NWDAFs as a target NWDAF.

It should be noted that, if the preset condition in the request information #b sent by the first network element to the NRF includes a plurality of analytics identifiers and/or a plurality of service names, the request information #b in the communication method 200 further includes a correspondence between the analytics identifiers and the service names. A specific correspondence manner is not limited in this application.

In the foregoing possible implementation #A3, the NRF stores the service name and the analytics identifier corresponding to the service name that are supported by the NWDAF, that is, the NRF stores the correspondence between the service name supported by the NWDAF and the analytics identifier supported by the NWDAF. Therefore, the NRF can assist, based on the service name and the analytics identifier corresponding to the service name in the preset condition of the first network element, the first network element in finding the NWDAF that meets the preset condition of the first network element, and the NWDAF may meet both the service name and the analytics identifier corresponding to the service name in the preset condition of the first network element, that is, the NWDAF determined by the NRF by using the preset condition of the first network element can completely match the NWDAF actually required by the first network element. That is, the service of the first network element is ensured, and the waste of resources is avoided.

The following further describes a second possible implementation of the communication method 100 in this application with reference to a specific registration parameter in FIG. 5 by using an example in which the network element information registered by the NWDAF with the NRF includes the correspondence between the analytics identifier and the service.

Possible Implementation #B

In the possible implementation #B, network element information registered by the NWDAF with the NRF includes a correspondence between an analytics identifier and a service name, and the correspondence between the analytics identifier and the service name includes: a correspondence between each analytics identifier and each service name corresponding to the analytics identifier, or a correspondence between each service name and each analytics identifier corresponding to the service name. It may be understood that a storage form of the correspondence between the analytics identifier and the service name is in a one-to-one correspondence rather than in a one-to-many correspondence.

With reference to FIG. 5, Table 11 shows an example of the network element information registered by the NWDAF in the possible implementation #B.

TABLE 11

| NWDAF #1 | |
| --- | --- |
| Analytics result exposure service | Analytics identifier #A |
| Analytics result exposure service | Analytics identifier #C |
| Data repository service | Analytics identifier #A |
| Data repository service | Analytics identifier #B |
| Model exposure service | Analytics identifier #B |
| NWDAF #2 | |
| Model exposure service | Analytics identifier #A |
| Data repository service | Analytics identifier #A |
| NWDAF #3 | |
| Analytics result exposure service | Analytics identifier #A |
| Model exposure service | Analytics identifier #A |
| Data repository service | Analytics identifier #A |

It should be noted that, the service name in the correspondence may be used as a first level, that is, the NRF preferentially determines a candidate data analytics network element based on a first service name, and then determines, based on a correspondence between the first service name and a first analytics identifier, that an analytics identifier corresponding to the first service name is a target data analytics network element of the first analytics identifier. Alternatively, the analytics identifier in the correspondence may be used as a first level, that is, the NRF preferentially determines a candidate data analytics network element based on a first analytics ID, and then determines, based on a correspondence between a first service name and the first analytics identifier, that a service name corresponding to the first analytics ID is a target data analytics network element of the first service name. This is not limited in this application.

For the communication method corresponding to the possible implementation #B, refer to the descriptions of the communication method 100 corresponding to the possible implementation #A2 and the possible implementation #A3. Details are not described herein again.

This application provides a communication method, so that an NRF can find, by using a correspondence between a service (or a function) and an analytics identifier, an NWDAF that matches an actual requirement of a first network element, and the first network element can successfully address an NWDAF that meets a preset condition of the first network element.

In the communication method provided in this application, when registering with the NRF, the NWDAF explicitly indicates an analytics identifier that can be supported by the NWDAF, a service that can be supported, and a correspondence between the analytics identifier that can be supported and the service that can be supported. When requesting the NWDAF from the NRF, the first network element also explicitly indicates an analytics identifier, a service, and a correspondence between the analytics identifier and the service that need to be supported the NWDAF that meets the preset condition of the first network element. The NRF determines, based on a correspondence manner between an analytics identifier and a service name in network element information locally registered by the NWDAF, to perform a local retrieval step of the NWDAF, finally determines an NWDAF that meets the preset condition of the first network element, and feeds back address information of the NWDAF to the first network element.

It should be understood that, the specific examples in embodiments of this application are only to help a person skilled in the art better understand embodiments of this application, rather than to limit the scope of embodiments of this application.

It should be understood that sequence numbers of the foregoing processes do not mean a sequence of performing the processes. The sequence of performing the processes should be determined according to functions and internal logic of the processes, and should not be construed as any limitation on the implementation processes of the embodiments of this application.

It should be further understood that, in embodiments of this application, unless otherwise specified or logically conflicted, terms and/or descriptions in different embodiments are consistent and may be mutually referenced. The technical features in different embodiments may be combined to form a new embodiment according to their internal logical relationships.

It should be further noted that, in embodiments of this application, "presetting", "preconfiguring", or the like may be implemented by prestoring corresponding code or a table in a device (for example, a network device), or in another manner that may indicate related information. A specific implementation of "presetting", "predefining", or the like is not limited in this application, for example, a preset rule or a preset constant in embodiments of this application.

It may be understood that, in the foregoing embodiments of this application, the method implemented by the communication device may alternatively be implemented by a component (for example, a chip or a circuit) that may be configured inside the communication device.

The communication methods provided in embodiments of this application are described above in detail with reference to FIG. 4 to FIG. 5. The foregoing communication methods are mainly described from a perspective of interaction between network elements. It may be understood that to implement the foregoing functions, each network element includes a corresponding hardware structure and/or software module for performing each function. A person skilled in the art should be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

Figure 6:
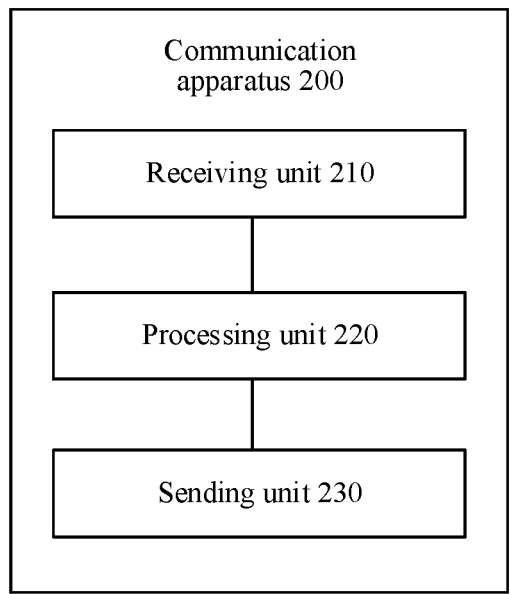
FIG. 6 is a schematic block diagram of a communication apparatus according to an embodiment of this application.
Figure 7:
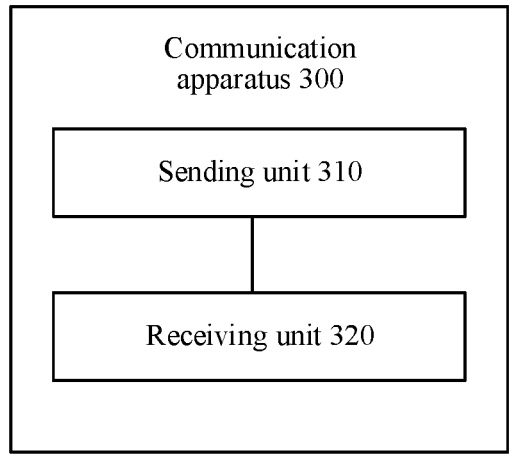
FIG. 7 is a schematic block diagram of another communication apparatus according to an embodiment of this application.
Figure 8:
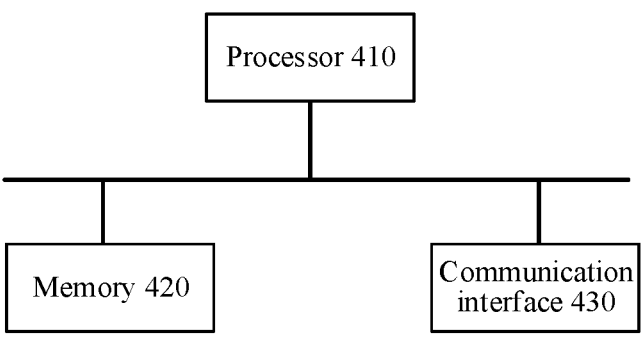
FIG. 8 is a schematic diagram of a structure of another communication device according to an embodiment of this application.

The following describes in detail a communication apparatus provided in embodiments of this application with reference to FIG. 6 to FIG. 8. It should be understood that descriptions of the apparatus embodiments correspond to the descriptions of the method embodiments. Therefore, for content that is not described in detail, refer to the foregoing method embodiments. For brevity, a part of content is not described herein again.

In embodiments of this application, functional modules of a transmit end device or a receive end device may be divided based on the foregoing method examples. For example, each functional module may be divided based on each corresponding function, or two or more functions may be integrated into one processing module. The integrated module may be implemented in a form of hardware, or may be implemented in a form of a software function module. It should be noted that, in this embodiment of this application, the module division is an example, and is merely logical function division, and there may be other division modes in actual applications. The following descriptions are made by using an example in which functional modules are divided corresponding to functions.

FIG. 6 is a schematic diagram of a structure of a communication apparatus 200. The communication apparatus includes a receiving unit 210, a processing unit 220, and a sending unit 230. The communication apparatus 200 may be the network repository function network element or the first network element (that is, the service consumer) in the foregoing method embodiments, or may be a chip configured to implement a function of the network repository function network element or the first network element in the foregoing method embodiments.

It should be understood that the communication apparatus 200 may correspond to the network repository function network element or the first network element in the communication method 100 according to embodiments of this application, and the communication apparatus 200 may include units configured to perform the method performed by the network repository function network element or the first network element in FIG. 4. In addition, the units in the communication apparatus 200 and the foregoing other operations and/or functions implement corresponding procedures of the communication method 100 in FIG. 4.

In a possible design, the communication apparatus 200 may implement any function of the network repository function network element in embodiments shown in FIG. 4.

For example, the receiving unit 210 is configured to receive a request message from a service request network element, where the request message is used to request information about a target data analytics network element, the request message includes a first analytics identifier and information about a first service, and the target data analytics network element supports an analytics type corresponding to the first analytics identifier and the first service.

The receiving unit 210 is further configured to receive association information between the first analytics identifier and a second service that corresponds to the target data analytics network element and that is sent by the target data analytics network element.

The receiving unit 210 is further configured to receive association information between a second analytics identifier and the first service that corresponds to the target data analytics network element and that is sent by the target data analytics network element.

The receiving unit 210 is further configured to receive network element type information of the service request network element.

The receiving unit 210 is further configured to receive information indicating an association relationship between the first analytics identifier and the information about the first service.

In a possible implementation, the second service includes a plurality of services, the first analytics identifier supports the plurality of services, and the plurality of services include the first service.

In a possible implementation, the second analytics identifier includes a plurality of analytics identifiers, the first service supports the plurality of analytics identifiers, and the plurality of analytics identifiers include the first analytics identifier.

The processing unit 220 is configured to determine the target data analytics network element based on the first analytics identifier, the information about the first service, and association information between the first analytics identifier and the first service that corresponds to the target data analytics network element.

In a possible implementation, the processing unit 220 is configured to determine a candidate data analytics network element based on the first analytics identifier, where the candidate data analytics network element supports the analytics type corresponding to the first analytics identifier; and determine the target data analytics network element from the candidate data analytics network element based on the information about the first service and the association information between the first analytics identifier and the first service that corresponds to the target data analytics network element.

In a possible implementation, the processing unit 220 is configured to determine a candidate data analytics network element based on the information about the first service, where the candidate data analytics network element supports the first service; and determine the target data analytics network element from the candidate data analytics network element based on the first analytics identifier and the association information between the first analytics identifier and the first service that corresponds to the target data analytics network element.

In a possible implementation, the processing unit 220 is configured to determine that the service request network element is a data analytics network element based on the network element type information of the service request network element; determine a candidate data analytics network element based on the first analytics identifier, where the candidate data analytics network element supports the analytics type corresponding to the first analytics identifier; and determine the target data analytics network element from the candidate data analytics network element based on the information about the first service and the association information between the first analytics identifier and the first service that corresponds to the target data analytics network element.

In a possible implementation, the processing unit 220 is configured to determine that the service request network element is a data analytics network element based on the network element type information of the service request network element; determine a candidate data analytics network element based on the information about the first service, where the candidate data analytics network element supports the first service; and determine the target data analytics network element from the candidate data analytics network element based on the first analytics identifier and the association information between the first analytics identifier and the first service that corresponds to the target data analytics network element.

The sending unit 230 is configured to send the information about the target data analytics network element to the service request network element.

The sending unit 230 is further configured to send the network element information of the service request network element, where the service request network element is a network element for requesting the target data analytics network element.

The sending unit 230 is further configured to send information indicating an association relationship between the first analytics identifier and the information about the first service.

In a possible design, the communication apparatus 200 may implement any function of the first network element (that is, the service request network element) in embodiments shown in FIG. 4.

For example, the processing unit 220 is configured to determine a preset condition that needs to be met by the requested target data analytics network element, that is, is configured to determine the first analytics identifier and the information about the first service that corresponds to the target data analytics network element.

In a possible implementation, the processing unit 220 is configured to determine the preset condition that needs to be met by the requested target data analytics network element, and when the preset condition includes more than one first analytics identifier and information about more than one first service, the processing unit 220 is further configured to determine association information (that is, a correspondence) between a plurality of first analytics identifiers and information about a plurality of first services.

The sending unit 230 is configured to send a request message to a network repository function network element, where the request message is used to request information about a target data analytics network element, the request message includes a first analytics identifier and information about a first service (that is, the preset condition), and the target data analytics network element supports an analytics type corresponding to the first analytics identifier and the first service.

The receiving unit 210 is configured to receive the information about the target data analytics network element.

In a possible implementation, the first service includes at least one of the following services: model request, model subscription, a data repository request, and data collection coordination. The second service includes at least one of the following services: model request, model subscription, a data repository request, and data collection coordination.

In a possible implementation, the information about the target data analytics network element includes address information of the target data analytics network element, and the address information of the target data analytics network element includes one or more of the following information: an identifier of a data analytics network element, an internet protocol address, a fully qualified domain name, and a uniform resource locator.

FIG. 7 is a schematic diagram of a structure of a communication apparatus 300. The communication apparatus includes a sending unit 310 and a receiving unit 320. The communication apparatus 300 may be the data analytics network element in the foregoing method embodiments, or may be a chip configured to implement a function of the data analytics network element in the foregoing method embodiments.

In a possible design, the communication apparatus 300 may implement any function of the data analytics network element in embodiments shown in FIG. 4.

For example, the sending unit 310 is configured to send registration request information to a network repository function network element, where the registration request information includes association information between a first analytics identifier and a first service that corresponds to a target data analytics network element.

The receiving unit 320 is configured to receive registration response information sent by the network repository function network element.

FIG. 8 is a block diagram of a structure of a communication network element 400 according to an embodiment of this application. The communication network element 400 shown in FIG. 8 includes a processor 410, a memory 420, and a communication interface 430. The processor 410 is coupled to the memory, and is configured to execute instructions stored in the memory, to control the communication interface 430 to send a signal and/or receive a signal.

It should be understood that the processor 410 and the memory 420 may be combined into one processing apparatus, and the processor 410 is configured to execute program code stored in the memory 420 to implement the foregoing functions. During specific implementation, the memory 420 may alternatively be integrated into the processor 410, or be independent of the processor 410.

In a possible design, the communication network element 400 may be the network repository function network element or the first network element (that is, the service request network element) in the foregoing method embodiments, or may be a chip configured to implement a function of the network repository function network element or the first network element in the foregoing method embodiments.

Specifically, the communication network element 400 may correspond to the network repository function network element or the first network element in the communication method 100 according to embodiments of this application, and the communication network element 400 may include units configured to perform the method performed by the network repository function network element or the first network element in FIG. 4. In addition, the units in the communication network element 400 and the foregoing other operations and/or functions are separately for implementing corresponding procedures of the method 100. It should be understood that a specific process in which the units perform the corresponding steps is described in detail in the foregoing method embodiments. For brevity, details are not described herein.

When the communication network element 400 is the chip, the chip includes a transceiver unit and a processing unit. The transceiver unit may be an input/output circuit or a communication interface. The processing unit may be a processor, a microprocessor, or an integrated circuit integrated on the chip. An embodiment of this application further provides a processing apparatus, including a processor and an interface. The processor may be configured to perform the method in the foregoing method embodiments.

It should be understood that the foregoing processing apparatus may be a chip. For example, the processing apparatus may be a field programmable gate array (FPGA), an application-specific integrated chip (ASIC), a system on chip (SoC), a central processing unit (CPU), a network processor (NP), a digital signal processor (DSP) circuit, a micro controller unit (MCU), a programmable logic device (PLD), or another integrated chip.

In an implementation process, steps in the foregoing methods can be completed by using a hardware integrated logical circuit in the processor, or by using instructions in a form of software. The steps of the methods disclosed with reference to embodiments of this application may be directly performed and completed through a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be completed by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to embodiments of this application may be directly performed and completed through a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memories of the system and method described herein are intended to include, but are not limited to, these and any other suitable types of memories.

According to the method provided in embodiments of this application, this application further provides a computer program product. The computer program product includes: computer program code. When the computer program code is run on a computer, the computer is enabled to perform the method in any extended embodiment in embodiments shown in FIG. 4.

According to the method provided in embodiments of this application, this application further provides a computer-readable medium, storing program code. When the program code is run on a computer, the computer is enabled to perform the method in embodiments shown in FIG. 4.

According to the method provided in embodiments of this application, this application further provides a system, including the foregoing apparatus or network element.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium that a computer can access or a data repository network element such as a server or a data center that includes one or more integrated available media. The available medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network side network element and the terminal network element in the foregoing apparatus embodiments completely correspond to the network side network element and the terminal network element in the method embodiments. A corresponding module or unit performs a corresponding step. For example, a communication unit (a communication interface) performs a receiving step or a sending step in the method embodiments, and other steps than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application that runs on a computing network element and a computing network element may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

It should be understood that, the term "and/or" in this specification is merely an association relationship for describing an associated object, and indicates that three relationships may exist. For example, A and/or B may represent the following three cases: Only A exists, both A and B exist, and only B exists. In addition, the character "/" in this specification generally indicates an "or" relationship between the associated objects.

It should be further understood that numbers "first", "second", "#a", "#b", "#1", "#2", and the like are introduced in embodiments of this application only to distinguish between different objects, for example, distinguish between different "data analytics network elements", "analytics identifiers", or "services". Understanding of specific objects and correspondences between different objects should be determined based on functions and internal logic of the specific objects, and shall not constitute any limitation on an implementation process of embodiments of this application.

A person of ordinary skill in the art may be aware that, in combination with the examples of units and algorithm steps described in embodiments disclosed in this specification, this application can be implemented by using electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer network element (which may be a personal computer, a server, a network element, or the like) to perform all or some of the steps of the methods described in embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving registering information from a first data analytics network element, wherein the registering information comprises association information between a first service name of a first service supported by the first data analytics network element and one or more analytics identifiers corresponding to the first service of the first data analytics network element;
   receiving a request message from a service request network element, wherein the request message is used to request information about a target data analytics network element, and the request message comprises a first analytics identifier and the first service name that need to be supported by the target data analytics network element;
   determining the first data analytics network element as the target data analytics network element based on the first analytics identifier, the first service name, and the association information, wherein the one or more analytics identifiers corresponding to the first service comprises the first analytics identifier; and sending information about the target data analytics net-
work element to the service request network element.

2. The communication method according to claim 1,
wherein the one or more analytics identifiers corresponding
to the first service comprise a plurality of analytics identities,
and the plurality of analytics identities comprises the first
analytics identifier.

3. The communication method according to claim 2,
wherein the determining the target data analytics network
element based on the first service name, the information
about the first service, and the association information
comprises:

determining at least one candidate data analytics network
element based on the first service name, wherein the at
least one candidate data analytics network element
supports the first service; and determining the target data analytics network element
from the at least one candidate data analytics network
element based on the first analytics identifier and the
association information.

4. The communication method according to claim 1,
wherein the request message further comprises information
indicating an association relationship between the first ana-
lytics identifier and the first service name.

5. The communication method according to claim 1,
wherein the first service comprises at least one of a model
request service, a model subscription service, an analytics
result exposure service, a data repository request service, or
a data collection coordination service.

6. The communication method according to claim 1,
wherein the information about the target data analytics
network element comprises one or more of the following
information:

an identifier of the target data analytics network element,
an internet protocol address of the target data analytics
network element, a fully qualified domain name of the
target data analytics network element, or a uniform
resource locator of the target data analytics network
element.

7. A communication apparatus, comprising at least one
processor and at least one memory, wherein the at least one
memory is coupled to the at least one processor and stores
programming instructions for execution by the at least one
processor to:

receive registering information from a first data analytics
network element, wherein the registering information
comprises association information between a first ser-
vice name of a first service supported by the first data
analytics network element and one or more analytics
identifiers corresponding to the first service of the first
data analytics network element;

receive a request message from a service request network
element, wherein the request message is used to request
information about a target data analytics network ele-
ment, and the request message comprises a first ana-
lytics identifier and the first service name that need to
be supported by the target data analytics network
element;

determine the first data analytics network element as the
target data analytics network element based on the first
analytics identifier, the first service name, and the
association information, wherein the one or more ana-
lytics identifiers corresponding to the first service com-
prises the first analytics identifier; and send the information about the target data analytics net-
work element to the service request network element.

8. The communication apparatus according to claim 7,
wherein the one or more analytics identifiers corresponding
to the first service comprise a plurality of analytics identi-
fiers, and the plurality of analytics identifiers comprise the
first analytics identifier.

9. The communication apparatus according to claim 7,
wherein the programming instructions are for execution by
the at least one processor to receive information indicating
an association relationship between the first analytics iden-
tifier and the first service name.

10. The communication apparatus according to claim 7,
wherein the first service comprises at least one of a model
request service, a model subscription service, an analytics
result exposure service, a data repository request service, or
a data collection coordination service.

11. A non-transitory computer-readable storage medium
comprising instructions which, when executed by one or
more processors, cause the one or more processors to
perform operations comprising:

receiving registering information from a first data analyt-
ics network element, wherein the registering informa-
tion comprises association information between a first
service name of a first service supported by the first
data analytics network element and one or more ana-
lytics identifiers corresponding to the first service of the
first data analytics network element;

receiving a request message from a service request net-
work element, wherein the request message is used to
request information about a target data analytics net-
work element, and the request message comprises a
first analytics identifier and the first service name that
need to be supported by the target data analytics
network element;

determining the first data analytics network element as the
target data analytics network element based on the first
analytics identifier, the first service name, and the
association information, wherein the one or more ana-
lytics identifiers corresponding to the first service com-
prises the first analytics identifier; and sending information about the target data analytics net-
work element to the service request network element.

12. The non-transitory computer-readable storage
medium according to claim 11, wherein the one or more
analytics identifiers corresponding to the first service com-
prise a plurality of analytics identities, and the plurality of
analytics identities comprises the first analytics identifier.

13. The non-transitory computer-readable storage
medium according to claim 12, wherein the determining the
target data analytics network element based on the first
service name, the information about the first service, and the
association information comprises:

determining at least one candidate data analytics network
element based on the first service name, wherein the at
least one candidate data analytics network element
supports the first service; and determining the target data analytics network element
from the at least one candidate data analytics network
element based on the first analytics identifier and the
association information.

14. The non-transitory computer-readable storage
medium according to claim 11, wherein the request message
further comprises information indicating an association rela-
tionship between the first analytics identifier and the first
service name.

15. The non-transitory computer-readable storage
medium according to claim 11, wherein the first service
comprises at least one of a model request service, a model subscription service, an analytics result exposure service, a data repository request service, or a data collection coordination service.

16. The non-transitory computer-readable storage medium according to claim 11, wherein the information about the target data analytics network element comprises one or more of the following information:

an identifier of the target data analytics network element, an internet protocol address of the target data analytics network element, a fully qualified domain name of the target data analytics network element, or a uniform resource locator of the target data analytics network element.

\* \* \* \* \*